United States Patent
Salehifar et al.

(10) Patent No.: US 12,081,756 B2
(45) Date of Patent: Sep. 3, 2024

(54) IMAGE CODING METHOD ON BASIS OF NON-SEPARABLE SECONDARY TRANSFORM AND DEVICE THEREFOR

(71) Applicant: LG Electronics Inc., Seoul (KR)

(72) Inventors: Mehdi Salehifar, Seoul (KR); Seunghwan Kim, Seoul (KR); Jaehyun Lim, Seoul (KR); Moonmo Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/377,146

(22) Filed: Oct. 5, 2023

(65) Prior Publication Data

US 2024/0040121 A1 Feb. 1, 2024

Related U.S. Application Data

(63) Continuation of application No. 17/864,666, filed on Jul. 14, 2022, now Pat. No. 11,818,350, which is a continuation of application No. 17/316,049, filed on May 10, 2021, now Pat. No. 11,627,320, which is a continuation of application No. 16/901,857, filed on Jun. 15, 2020, now Pat. No. 11,039,140, which is a continuation of application No. PCT/KR2018/015812, filed on Dec. 13, 2018.

(60) Provisional application No. 62/599,021, filed on Dec. 15, 2017.

(51) Int. Cl.
*H04N 19/122* (2014.01)
*H04N 19/167* (2014.01)
*H04N 19/176* (2014.01)
*H04N 19/91* (2014.01)

(52) U.S. Cl.
CPC ......... *H04N 19/122* (2014.11); *H04N 19/167* (2014.11); *H04N 19/176* (2014.11); *H04N 19/91* (2014.11)

(58) Field of Classification Search
None
See application file for complete search history.

(56) References Cited

U.S. PATENT DOCUMENTS

2019/0052876 A1* 2/2019 Lee ...................... H04N 19/157

OTHER PUBLICATIONS

Chen et al., "Algorithm Description of Joint Exploration Test Model 5 (JEM)", Joint Video Exploration Team (JVET) of ITU-T SG 16 WP 3 and ISO/IEC JTC 1/SC 29/WG 11, 5th Meeting: Geneva, CH, Jan. 12-20, 2017, JVET-E1001-v2.*

* cited by examiner

*Primary Examiner* — Edemio Navas, Jr.
(74) *Attorney, Agent, or Firm* — Fish & Richardson P.C.

(57) ABSTRACT

An image decoding method performed by means of a decoding device according to the present disclosure comprises the steps of: deriving transform coefficients of a target block from a bitstream; deriving a non-separable secondary transform (NSST) index with respect to the target block; performing inverse transform with respect to the transform coefficients of the target block on the basis of the NSST index and thus deriving residual samples of the target block; and generating a reconstructed picture on the basis of the residual samples.

4 Claims, 18 Drawing Sheets

FIG. 12
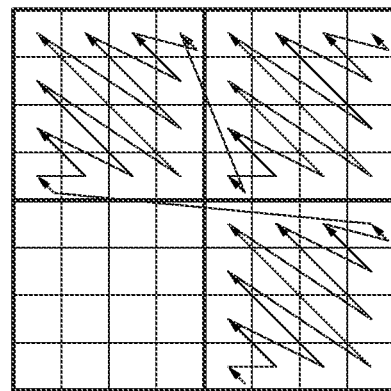
Scanning Y
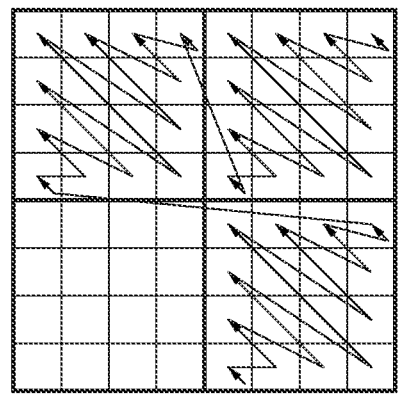
Scanning Cb
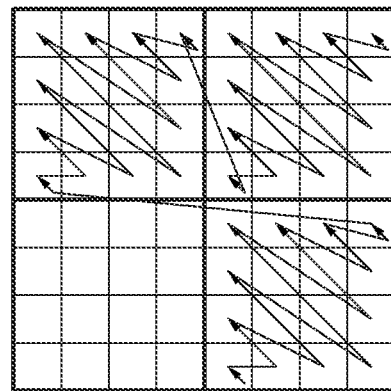
Scanning Cr

IMAGE CODING METHOD ON BASIS OF NON-SEPARABLE SECONDARY TRANSFORM AND DEVICE THEREFOR

CROSS-REFERENCE TO RELATED APPLICATIONS

This application is a continuation of U.S. application Ser. No. 17/864,666, filed on Jul. 14, 2022, which is a continuation of U.S. application Ser. No. 17/316,049, filed on May 10, 2021, now U.S. Pat. No. 11,627,320, which is a continuation of U.S. application Ser. No. 16/901,857, filed on Jun. 15, 2020, now U.S. Pat. No. 11,039,140, which is a continuation pursuant to 35 U.S.C. § 119(e) of International Application PCT/KR2018/015812, with an international filing date of Dec. 13, 2018, which claims the benefit of U.S. Provisional Application No. 62/599,021 filed on Dec. 15, 2017, the contents of which are all hereby incorporated by reference herein in their entirety.

BACKGROUND OF THE DISCLOSURE

Field of the Disclosure

The present disclosure relates to a video coding technique, and more particularly, to a video decoding method and apparatus therefor according to non-separable secondary transform in a video coding system.

Related Art

Demand for high-resolution, high-quality images such High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE DISCLOSURE

The present disclosure provides a method and apparatus for improving video coding efficiency.

The present disclosure also provides a video decoding method and apparatus for applying NS ST for a target block.

The present disclosure also provides a video decoding method and apparatus for deriving a range of NS ST index based on a specific condition of a target block.

The present disclosure also provides a video decoding method and apparatus for determining whether to code NS ST index based on a transform coefficient of a target block.

According to an embodiment of the present disclosure, it is provided a video decoding method performed by a decoding apparatus. The method includes deriving transform coefficients of a target block from a bitstream; deriving a Non-Separable Secondary Transform (NSST) index for the target block; deriving residual samples of the target block by performing inverse transforming for the transform coefficients of the target block based on the NSST index; and generating a reconstructed picture based on the residual samples.

According to another embodiment of the present disclosure, it is provided a decoding apparatus performing a video decoding. The decoding apparatus includes an entropy decoder for deriving transform coefficients of a target block from a bitstream and deriving a Non-Separable Secondary Transform (NSST) index for the target block; an inverse transformer for deriving residual samples of the target block by performing inverse transforming for the transform coefficients of the target block based on the NSST index; and an adder for generating a reconstructed picture based on the residual samples.

According to still another embodiment of the present disclosure, it is provided a video encoding method performed by an encoding apparatus. The method includes deriving residual samples of a target block; deriving transform coefficients of the target block by performing transform for the residual samples; determining whether to encode a Non-Separable Secondary Transform (NSST) index for the transform coefficients; and encoding information for transform coefficients, wherein the step of determining whether to encode the NS ST index includes: scanning R+1th to Nth transform coefficients among the transform coefficients of the target block; and when a non-zero transform coefficient is included in the R+1th to Nth transform coefficients, determining not to encode the NSST index, and wherein the N is a sample number of the top-left target area, and the R is a reduced coefficient, and wherein the R is smaller than the N.

According to still another embodiment of the present disclosure, it is provided a video encoding apparatus. The encoding apparatus includes an adder for deriving residual samples of a target block; a transformer for deriving transform coefficients of the target block by performing transform for the residual samples; determining whether to encode a Non-Separable Secondary Transform (NSST) index for the transform coefficients; and an entropy encoder for encoding information for transform coefficients, wherein the entropy encoder scans R+1th to Nth transform coefficients among the transform coefficients of the target block; and when a non-zero transform coefficient is included in the R+1th to Nth transform coefficients, determines not to encode the NSST index, and wherein the N is a sample number of the top-left target area, and the R is a reduced coefficient, and wherein the R is smaller than the N.

According to the present disclosure, a range of NSST index may be derived based on a specific condition of a target block, and through this, bit amount for the NSST index may be reduced, and accordingly, overall coding rate may be improved.

According to the present disclosure, a transmission of syntax element for NSST index may be determined based on transform coefficients for a target block, and through this, bit amount for the NSST index may be reduced, and accordingly, overall coding rate may be improved.

BRIEF DESCRIPTION OF THE DRAWINGS

FIG. 12 illustrates an example of scanning transform coefficients from R+1 to N for all components of a target block.

DESCRIPTION OF EXEMPLARY EMBODIMENTS

Figure 1:
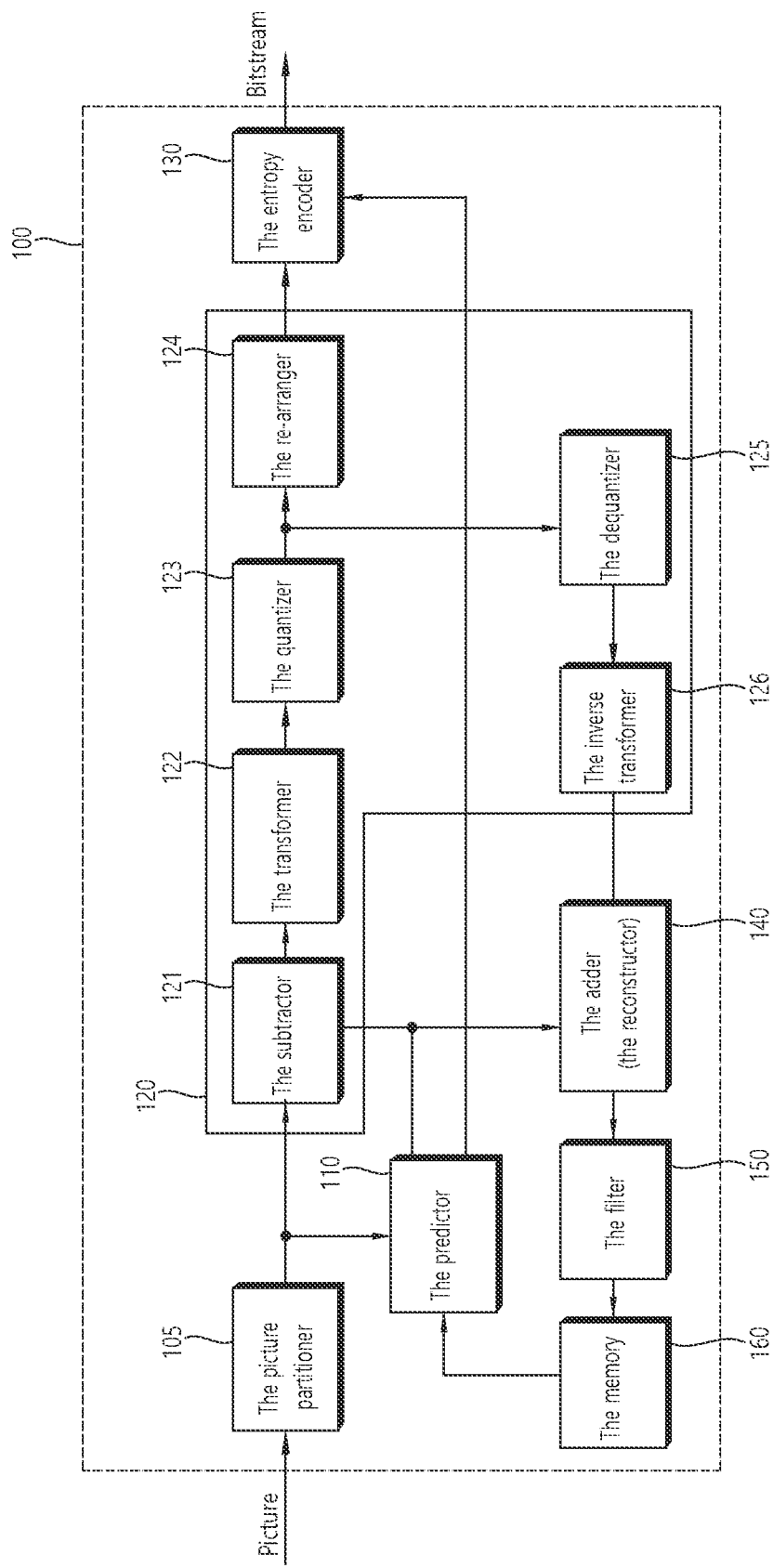
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
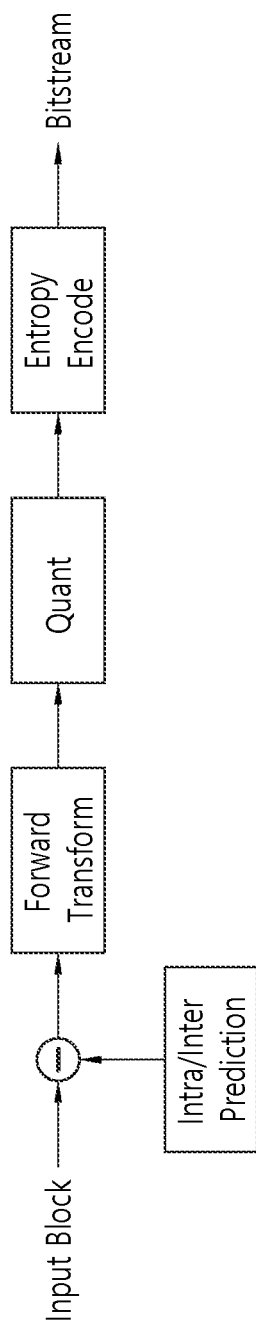
FIG. 2 illustrates an example of a video encoding method performed by a video encoding apparatus.

FIG. 2 illustrates an example of a video encoding method performed by a video encoding apparatus. Referring to FIG. 2, the video encoding method may include procedures of intra/inter prediction, transform, quantization and entropy encoding. For example, a prediction block of a current block may be generated through the intra/inter prediction and a residual block of the current block may be generated through subtraction between an input block of the current block and the prediction block. Later, through a transform for the residual block, a coefficient block, that is, transform coefficients for the current block may be generated. The transform coefficients may be quantized and entropy-encoded and then, stored in a bitstream.

Figure 3:
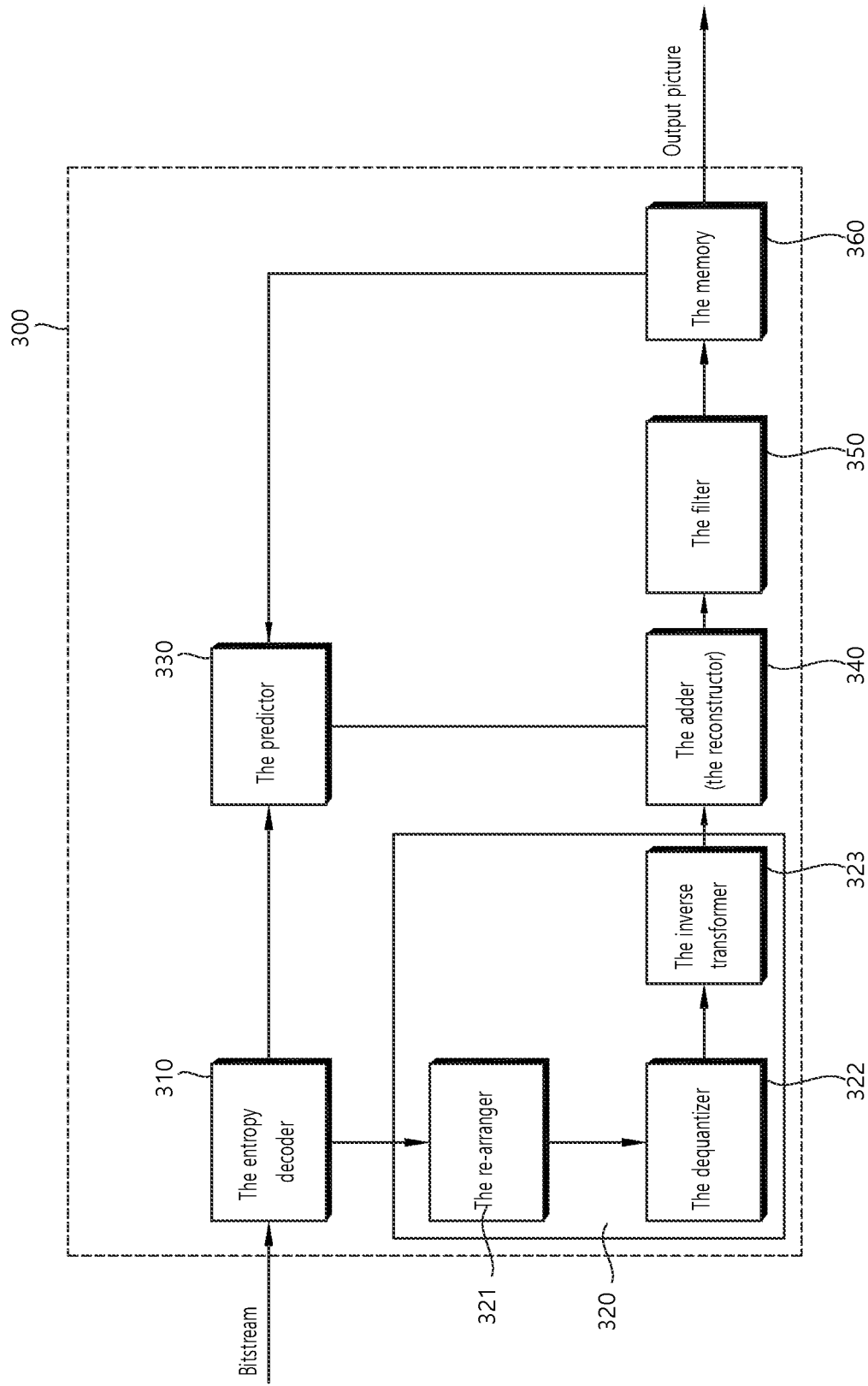
FIG. 3 is a schematic diagram illustrating a configuration of a video decoding apparatus to which the present disclosure is applicable.

FIG. 3 is a schematic diagram illustrating a configuration of a video decoding apparatus to which the present disclosure is applicable.

Referring to FIG. 3, a video decoding apparatus 300 includes an entropy decoder 310, a residual processor 320, a predictor 330, an adder 340, a filter 350 and a memory 360. Here, the residual processor 320 may include a re-arranger 321, a dequantizer 322 and an inverse transformer 323.

When a bitstream including video information is input, the video decoding apparatus 300 may reconstruct a video corresponding to a process in which the video information is processed in the video encoding apparatus.

For example, the video decoding apparatus 300 may perform video decoding using a processor applied in the video encoding apparatus. Thus, the processor of video decoding may be a coding unit, for example, or may be a coding unit, a prediction unit or a transform unit, for another example. The coding unit may be partitioned according to a quad tree structure and/or binary tree structure from the largest coding unit.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 310 may parse the bitstream to output information required for video reconstruction or picture reconstruction. For example, the entropy decoder 310 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder 310 may be provided to the predictor 350 and residual values, that is, quantized transform coefficients, on which entropy decoding has been performed by the entropy decoder 310 may be input to the re-arranger 321.

The re-arranger 321 may rearrange the quantized transform coefficients into a two-dimensional block form. The re-arranger 321 may perform rearrangement corresponding to coefficient scanning performed by the encoding apparatus. Although the re-arranger 321 is described as a separate component, the re-arranger 321 may be a part of the dequantizer 322.

The dequantizer 322 may de-quantize the quantized transform coefficients based on a (de)quantization parameter to output a transform coefficient. In this case, information for deriving a quantization parameter may be signaled from the encoding apparatus.

The inverse transformer 323 may inverse-transform the transform coefficients to derive residual samples.

The predictor 330 may perform prediction on a current block and may generate a predicted block including prediction samples for the current block. A unit of prediction performed in the predictor 330 may be a coding block or may be a transform block or may be a prediction block.

The predictor 330 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 330 may derive a prediction sample for a current block based on a neighboring reference sample in a current picture. The predictor 330 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 330 may derive a prediction sample for a current block based on a sample specified in a reference picture according to a motion vector. The predictor 330 may derive the prediction sample for the current block using one of the skip mode, the merge mode and the MVP mode. Here, motion information required for inter-prediction of the current block provided by the video encoding apparatus, for example, a motion vector and information on a reference picture index may be acquired or derived based on the information on prediction.

In the skip mode and the merge mode, motion information of a neighboring block may be used as motion information of the current block. Here, the neighboring block may include a spatial neighboring block and a temporal neighboring block.

The predictor 330 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 330 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 330 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 330 may acquire a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 340 may add a residual sample to a prediction sample to reconstruct a current block or a current picture. The adder 340 may reconstruct the current picture by adding the residual sample to the prediction sample in units of a block. When the skip mode is applied, a residual is not transmitted and thus the prediction sample may become a reconstructed sample. Although the adder 340 is described as a separate component, the adder 340 may be a part of the predictor 330. Meanwhile, the adder 340 may be referred to as a reconstructor or reconstructed block generator.

The filter 350 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 360 may store a reconstructed picture (decoded picture) or information necessary for decoding. Here, the reconstructed picture may be the reconstructed picture filtered by the filter 350. For example, the memory 360 may store pictures used for inter-prediction. Here, the pictures used for inter-prediction may be designated according to a reference picture set or a reference picture list. A reconstructed picture may be used as a reference picture for other pictures. The memory 360 may output reconstructed pictures in an output order.

Figure 4:
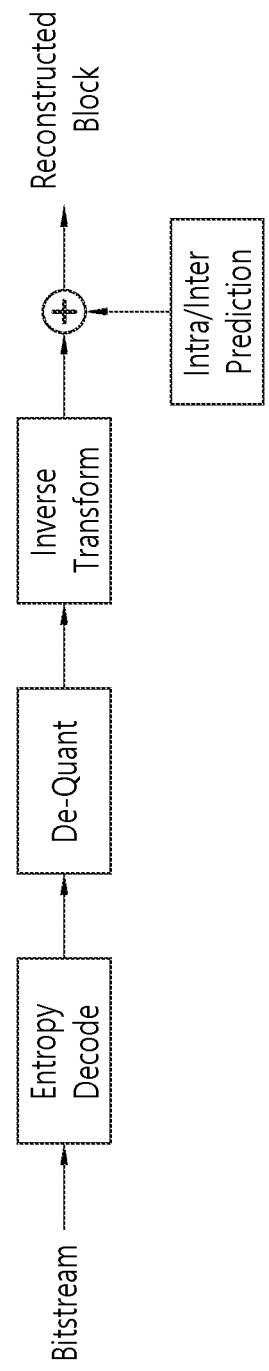
FIG. 4 illustrates an example of a video decoding method performed by a decoding apparatus.

FIG. 4 illustrates an example of a video decoding method performed by a decoding apparatus. Referring to FIG. 4, the video decoding method may include procedures of entropy decoding, dequantization, inverse transform and intra/inter prediction. For example, inverse procedures of the encoding method may be performed in the decoding apparatus. Particularly, through entropy decoding for a bitstream, quantized transform coefficients may be obtained and through dequantization procedure for the quantized transform coefficients, a coefficient block of the current block, that is, transform coefficients may be obtained. Through inverse transform for the transform coefficients, a residual block of the current block may be derived, and through summation of a prediction block of the current block and the residual block derived through intra/inter prediction, a reconstructed block of the current block may be derived.

Meanwhile, through the transform described above, transform coefficients of lower frequency for the residual block of the current block may be derived, and at an end of the residual block, a zero tail may be derived.

Particularly, the transform may include two types of main procedures, and the main procedures may include a core transform and a secondary transform. The transform including the core transform and the secondary transform may be represented as multi-transform scheme.

Figure 5:
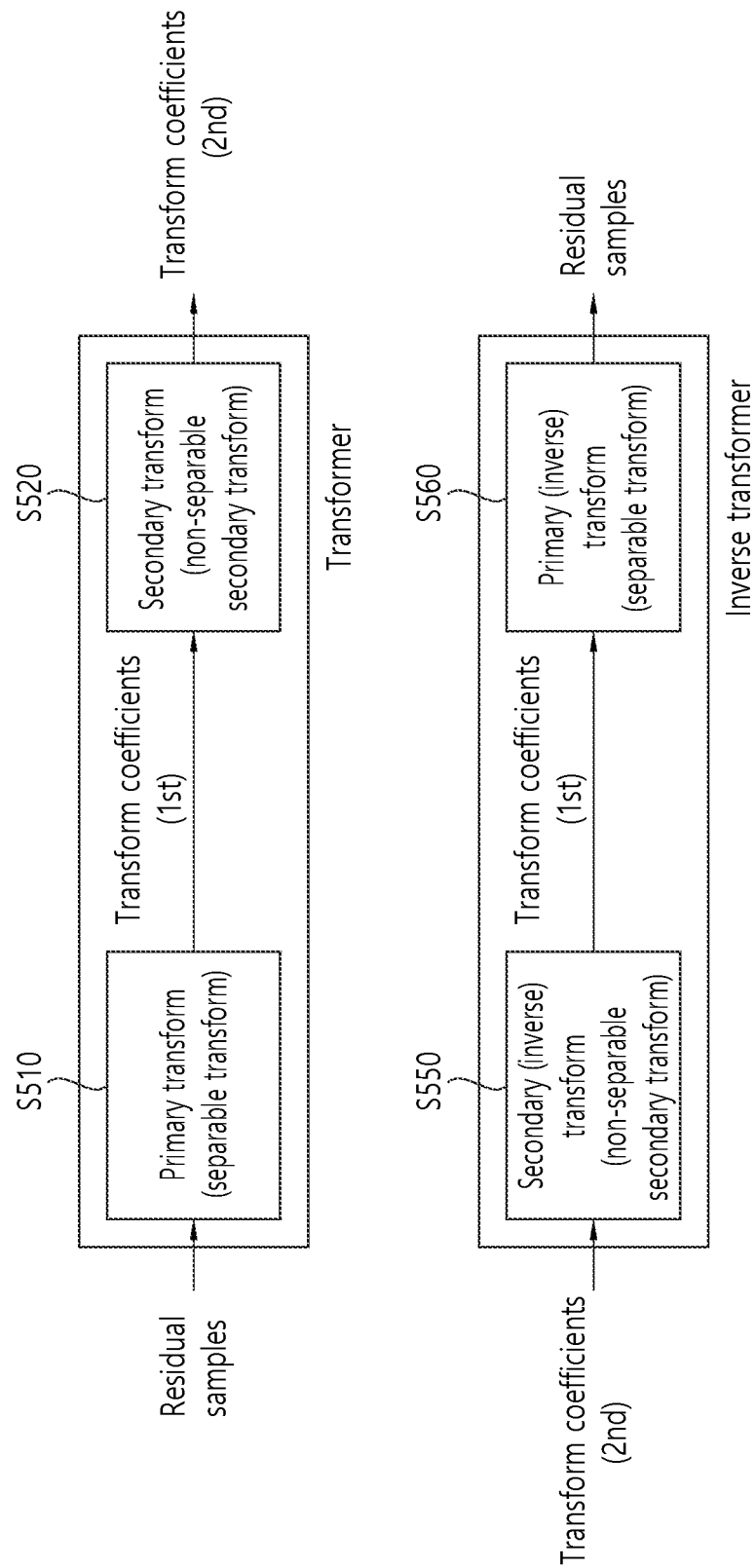
FIG. 5 schematically illustrates a multi-transform scheme according to the present disclosure.

FIG. 5 schematically illustrates a multi-transform scheme according to the present disclosure.

Referring to FIG. 5, the transformer may correspond to the transformer of the encoding apparatus of FIG. 1, and the inverse transformer may correspond to the inverse transformer of the encoding apparatus of FIG. 1 or the inverse transformer of the decoding apparatus of FIG. 3.

The transformer may derive (primary) transform coefficients by performing a primary transform based on residual samples (residual sample array) within a residual block (S510). In this case, the primary transform may include an Adaptive Multiple core Transform (AMT). The adaptive multiple core transform may also be represented as a Multiple Transform Set (MTS).

The adaptive multiple core transform may indicate a method of performing a transform additionally using a discrete cosine transform (DCT) Type 2, a discrete sine transform (DST) Type 7, a DCT Type 8 and/or a DST Type 1. That is, the adaptive multiple core transform may indicate a transform method of transforming a residual signal (or residual block) of a spatial domain into transform coefficients (or primary transform coefficients) of a frequency domain based on a plurality of transform kernels selected among the DCT Type 2, the DST Type 7, the DCT Type 8 and the DST Type 1. In this case, the primary transform coefficients may be called temporary transform coefficients from the viewpoint of the transformer.

In other words, in the case that the existing transform method is applied, transform coefficients may be generated by applying a transform from a spatial domain for a residual signal (or residual block) to a frequency domain based on the DCT Type 2. On the other hand, in the case that the adaptive multi-core transform is applied, transform coefficients (or primary transform coefficients) may be generated by applying a transform from a spatial domain for a residual signal (or residual block) to a frequency domain based on the DCT Type 2, the DST Type 7, the DCT Type 8 and/or the DST Type 1. In this case, the DCT Type 2, the DST Type 7, the DCT Type 8 and the DST Type 1 may be called a transform type, a transform kernel or a transform core.

For reference, the DCT/DST transform types may be defined based on basis functions. The basis functions may be represented as follows.

TABLE 1

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In the case that the adaptive multi-core transform is performed, a vertical transform kernel and a horizontal transform kernel for a target block may be selected among transform kernels. A vertical transform for a target block may be performed based on the vertical transform kernel. A horizontal transform for the target block may be performed based on the horizontal transform kernel. In this case, the horizontal transform may represent a transform for the horizontal components of the target block. The vertical transform may represent a transform for the vertical components of the target block. The vertical transform kernel/horizontal transform kernel may be adaptively determined based on a prediction mode of the target block (CU or sub-block) encompassing a residual block and/or a transform index indicative of a transform subset.

For example, the adaptive multi-core transform may be applied to the case that both of a width and a height of a target block are equal to or smaller than 64, and it may be determined based on a CU level flag whether the adaptive multi-core transform is applied. Particularly, in the case that the CU level flag is 0, the existing transform method described above may be applied. That is, in the case that the CU level flag is 0, the transform from a spatial domain for a residual signal (or residual block) to a frequency domain based on the DCT Type 2 may be applied and transform coefficients may be generated, and the transform coefficients may be encoded. Meanwhile, here, the target block may be a CU. In the case that the CU level flag is 0, the adaptive multi-core transform may be applied to the target block.

In addition, in the case of a luma block of the target block to which the adaptive multi-core transform is applied, two additional flags may be signaled, and based on the flags, a vertical transform kernel and a horizontal transform kernel may be selected. The flag for the vertical transform kernel may be represented as AMT vertical flag, and AMT_TU_vertical_flag (or EMT_TU_vertical_flag) may represent a syntax element of the AMT vertical flag. The flag for the horizontal transform kernel may be represented as AMT horizontal flag, and AMT_TU_horizontal_flag (or EMT_TU_horizontal_flag) may represent a syntax element of the AMT horizontal flag. The AMT vertical flag may indicate one transform kernel candidate among the transform kernel candidates included in a transform subset for the vertical transform kernel, and the transform kernel candidate indicated by the AMT vertical flag may be derived as a vertical transform kernel for the target block. Furthermore, the AMT horizontal flag may indicate one transform kernel candidate among the transform kernel candidates included in a transform subset for the horizontal transform kernel, and the transform kernel candidate indicated by the AMT horizontal flag may be derived as a horizontal transform kernel for the target block. Meanwhile, the AMT vertical flag may be represented as MTS vertical flag, and the AMT horizontal flag may be represented as MTS horizontal flag.

Meanwhile, three transform subsets may be preconfigured, and based on the intra prediction mode applied to the target block, one of the transform subsets may be derived as a transform subset for the vertical transform kernel. In addition, one of the transform subsets may be derived as a transform subset for the horizontal transform kernel based on the intra prediction mode applied to the target block. For example, the preconfigured transform subsets may be derived as represented in the following Table.

TABLE 2

| Transform Set | Transform Candidates |
|---|---|
| 0 | DST-VII, DCT-VIII |
| 1 | DST-VII, DST-I |
| 2 | DST-VII, DCT-VIII |

Referring to Table 2, the transform subset of which index value is 0 may represent a transform subset including DST type 7 and DCT type 7 as a transform kernel candidate. The transform subset of which index value is 1 may represent a transform subset including DST type 7 and DCT type 1 as a transform kernel candidate. The transform subset of which index value is 2 may represent a transform subset including DST type 7 and DCT type 8 as a transform kernel candidate.

The transform subset for the vertical transform kernel and the transform subset for the horizontal transform kernel derived based on the intra prediction mode applied to the target block may be derived as represented in the following Table.

TABLE 3

| Intra Mode | | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | | | | | | | | | | | | | | | | | |
|---|---|---|---|---|---|---|---|---|---|---|---|---|---|---|---|---|---|
| | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | | | | | | | | | | | | | | |
|---|---|---|---|---|---|---|---|---|---|---|---|---|---|---|
| | 53 | 54 | 55 | 56 | 57 | 58 | 59 | 60 | 61 | 62 | 63 | 64 | 65 | 66 |
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

Herein, V represents the transform subset for the vertical transform kernel and H represents the transform subset for the horizontal transform kernel.

In the case that a value of the AMT flag (or EMT_CU_flag) is 1, as represented in Table 3, the transform subset for the vertical transform kernel and the transform subset for the horizontal transform kernel may be derived based on the intra prediction mode of the target block. Later, among the transform kernel candidates included in the transform subset for the vertical transform kernel, a transform kernel candidate indicated by the AMT vertical flag of the target block may be derived as the vertical transform kernel of the target block, and among the transform kernel candidates included in the transform subset for the horizontal transform kernel, a transform kernel candidate indicated by the AMT horizontal flag of the target block may be derived as the horizontal transform kernel of the target block. Meanwhile, the AMT flag may also be represented as MTS flag.

For reference, for example, an intra prediction mode may include two non-directional (or non-angular) intra prediction modes and 65 directional (or angular) intra prediction modes. The non-directional intra prediction mode may include a No. 0 (planar) intra prediction mode and a No. 1 DC intra prediction mode. The directional intra prediction modes may include No. 2 to No. 66 sixty-five intra prediction modes. However, they are examples, and the present disclosure may be applied to a case where the number of intra prediction modes is different. Meanwhile, in some cases, No. 67 intra prediction mode may be further used. The No. 67 intra prediction mode may represent a linear model (LM) mode.

Figure 6:
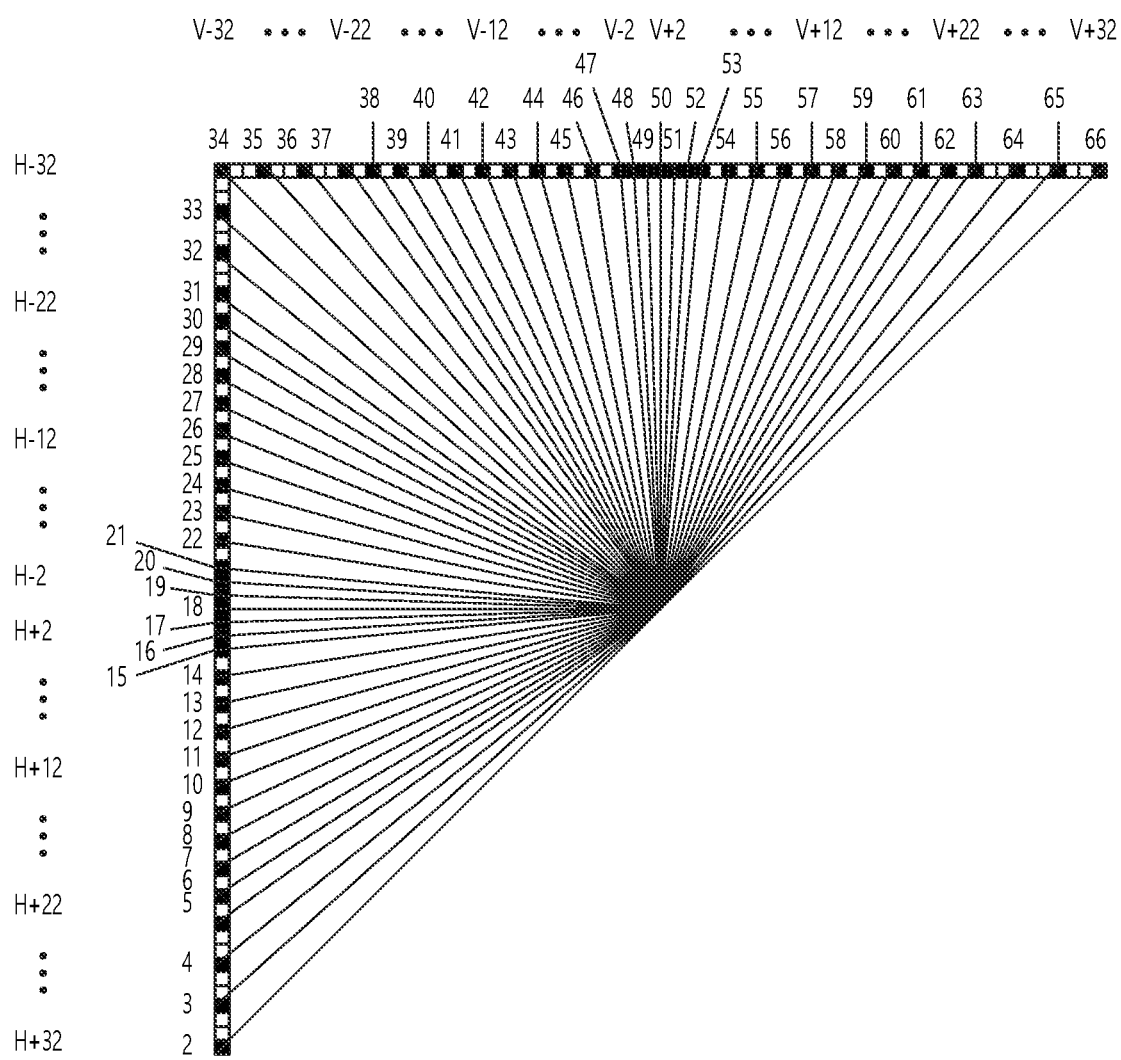
FIG. 6 illustrates 65 intra direction modes of a prediction direction.

FIG. 6 illustrates 65 intra direction modes of a prediction direction.

Referring to FIG. 6, modes may be divided into intra prediction modes having horizontal directionality and intra prediction modes having vertical directionality based on a No. 34 intra prediction mode having a left-upward diagonal prediction direction. In FIG. 6, H and V mean the horizontal directionality and the vertical directionality, respectively, and numbers −32~32 indicate the displacements of a 1/32 unit on a sample grid position. No. 2 to No. 33 intra prediction modes have horizontal directionality, and No. 34 to No. 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a left-downward diagonal intra prediction mode, the No. 34 intra prediction mode may be called a left-upward diagonal intra prediction mode, and the No. 66 intra prediction mode may be called a right-upward diagonal intra prediction mode.

The transformer may perform a secondary transform based on the (primary) transform coefficients and derive (secondary) transform coefficients (step, S520). Whereas the primary transform is a transform from a spatial domain to a frequency domain, the secondary transform may be regarded as a transform from a frequency domain to a frequency domain. The secondary transform may include a non-separable transform. In this case, the secondary transform may be called a non-separable secondary transform (NSST) or mode-dependent non-separable secondary transform (MDNSST). The non-separable secondary transform may represent a transform for generating transform coefficients (or secondary transform coefficients) for a residual signal by secondary-transform the (primary) transform coefficients derived through the primary transform based on a non-separable transform matrix. Here, the vertical transform and the horizontal transform are not separately (or independently) applied for the (primary) transform coefficients based on the non-separable transform matrix, but the vertical transform and the horizontal transform may be applied once. In other words, the non-separable secondary transform may represent a transform method for generating transform coefficients (or secondary transform coefficients) by transforming a vertical component and a horizontal component together based on the non-separable transform matrix, not transforming a vertical component and a horizontal component separately. The non-separable secondary transform may be applied to a top-left area of a block including (primary) transform coefficients (hereinafter, this may be called a transform coefficient block or a target block). For example, in the case that both of a width (W) and a height (H) of the transform coefficient block are 8 or more, 8×8 non-separable secondary transform may be applied to top-left 8×8 area of the transform coefficient block (hereinafter, top-left target area). In addition, in the case that either one of a width (W) and a height (H) of the transform coefficient block is 8 or smaller while both of a width (W) and a height (H) of the transform coefficient block are 4 or more and, 4×4 non-separable secondary transform may be applied to top-left min(8,W)×min(8,H) area of the transform coefficient block.

Particularly, for example, in the case that 4×4 input block is used, the non-separable secondary transform may be performed as below.

The 4×4 input block X may be represented as below.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

When the X is represented as a vector form, vector $\vec{X}$ may be represented as below.

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T$$ [Equation 2]

In this case, the non-separable secondary transform may be calculated as below.

$$\vec{F} = T\vec{X}$$ [Equation 3]

Herein, $\vec{F}$ represents a transform coefficient vector, and T represents 16×16 (non-separable) transform matrix.

Through Equation 3 above, 16×1 transform coefficient vector $\vec{F}$ may be derived, and the $\vec{F}$ may be re-organized with a 4×4 block through a scan order (horizontal, vertical, diagonal, etc.). However, the calculation is an example, and Hypercube-Givens Transform (HyGT) and the like may be used for calculating the non-separable secondary transform in order to reduce a calculation complexity of the non-separable secondary transform.

Meanwhile, in the non-separable secondary transform, a transform kernel (or transform core, transform type) may be selected in mode dependent manner. Here, the mode may include an intra prediction mode and/or an inter prediction mode.

As described above, the non-separable secondary transform may be performed based on 8×8 transform or 4×4 transform determined based on a width (W) and a height (H) of the transform coefficient block. That is, the non-separable secondary transform may be performed based on 8×8 subblock size or 4×4 subblock size. For example, for selecting the mode dependent transform kernel, three 35-set of non-separable secondary transform kernels may be configured for the non-separable secondary transform for both of 8×8 subblock size and 4×4 subblock size. That is, 35 transform sets are configured for 8×8 subblock size and 35 transform sets are configured for 4×4 subblock size. In this case, three 8×8 transform kernels may be included in each of 35 transform sets for 8×8 subblock size. In this case, three 4×4 transform kernels may be included in each of 35 transform sets for 4×4 subblock size. However, the transform subblock size, the number of sets and the number of the transform kernels in a set are examples, but a size except 8×8 or 4×4 may be used, or n sets may be configured, and k transform kernels may be included in each set.

The transform set may be called NS ST set, and the transform kernel in the NS ST set may be called NS ST kernel. A selection of a specific set among the transform sets may be performed based on an intra prediction mode of a target block (CU or subblock), for example.

In this case, mapping between the 35 transform sets and the intra prediction modes may be represented as the following Table, for example. For reference, in the case that the LM mode is applied to a target block, the secondary transform may not be applied to the target block.

TABLE 4

| | intra mode | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| set | 0 | 1 | 2 | 3 | 4 | 5 | 6 | 7 | 8 | 9 | 10 | 11 | 12 | 13 | 14 | 15 | 16 |
| | intra mode | | | | | | | | | | | | | | | |
| | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |

TABLE 4-continued

| | intra mode | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |

| | intra mode | | | | | | | | | | | | | | | | |
|---|---|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

Meanwhile, when it is determined that a specific set is used, one of k transform kernels in the specific set may be selected through a non-separable secondary transform index. The encoding apparatus may derive a non-separable secondary transform index indicating a specific transform kernel based on rate-distortion (RD) check and signal the non-separable secondary transform index to the decoding apparatus. The decoding apparatus may select one of k transform kernels in the specific set based on the non-separable secondary transform index. For example, NSST index value 0 may indicate a first non-separable secondary transform kernel, NSST index value 1 may indicate a second non-separable secondary transform kernel, and NSST index value 2 may indicate a third non-separable secondary transform kernel. Alternatively, NSST index value 0 may indicate that a first non-separable secondary transform is not applied to a target block, and NS ST index values 1 to 3 may indicate the three transform kernels.

Referring to FIG. 5 again, the transformer may perform the non-separable secondary transform based on the selected transform kernels and obtain (secondary) transform coefficients. As described above, the transform coefficients may be derived as quantized transform coefficients through the quantizer and encoded and signaled to the decoding apparatus and forwarded to the dequantizer/inverse transformer in the encoding apparatus.

Meanwhile, in the case that the secondary transform is omitted, the (primary) transform coefficients, which are an output of the primary (separable) transform, may be derived as quantized transform coefficients through the quantizer as described above and encoded and signaled to the decoding apparatus and forwarded to the dequantizer/inverse transformer in the encoding apparatus.

The inverse transformer may perform a series of procedures in a reverse order of the procedures performed in the transformer. The inverse transformer may receive (dequantized) transform coefficients and derive (primary) transform coefficients by performing secondary (inverse) transform (step, S550) and obtain a residual block (residual samples) by performing primary (inverse) transform for the (primary) transform coefficients. Here, the primary transform coefficients may be called modified transform coefficients in an aspect of the inverse transformer. The encoding apparatus and the decoding apparatus may generate a reconstructed block based the residual block and the predicted block, and based on it, generate a reconstructed picture, as described above.

Meanwhile, as described above, in the case that the secondary transform is omitted, (dequantized) transform coefficients are received, the primary (separable) transform is performed, and a residual block (residual samples) may be obtained. The encoding apparatus and the decoding apparatus may generate a reconstructed block based the residual block and the predicted block, and based on it, generate a reconstructed picture, as described above.

Meanwhile, the non-separable secondary transform may not be applied to a block coded with a transform skip mode. For example, in the case that an NSST index for a target CU is signaled and a value of the NSST index is not 0, the non-separable secondary transform may not be applied to a block coded with a transform skip mode in the target CU. In addition, in the case that the target CU including blocks of all components (luma component, chroma component, etc.) is coded with the transform skip mode or in the case that the number of transform coefficients which is non-zero among the transform coefficients for the target CU is smaller than 2, the NS ST index may not be signaled. A detailed coding process of a transform coefficient is as below.

Figure 7A:
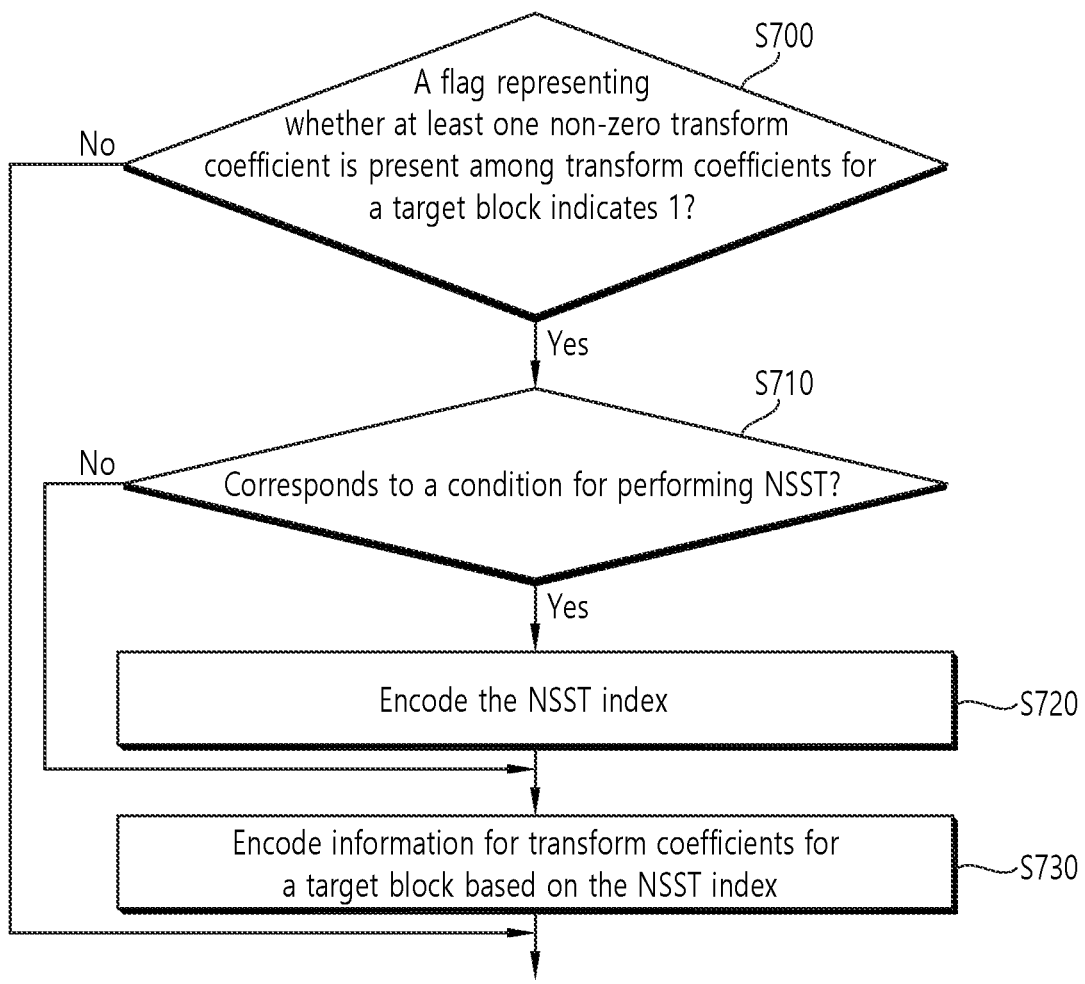
FIG. 7a and FIG. 7b are flowcharts illustrating a coding process of a transform coefficient according to an embodiment.
Figure 7B:
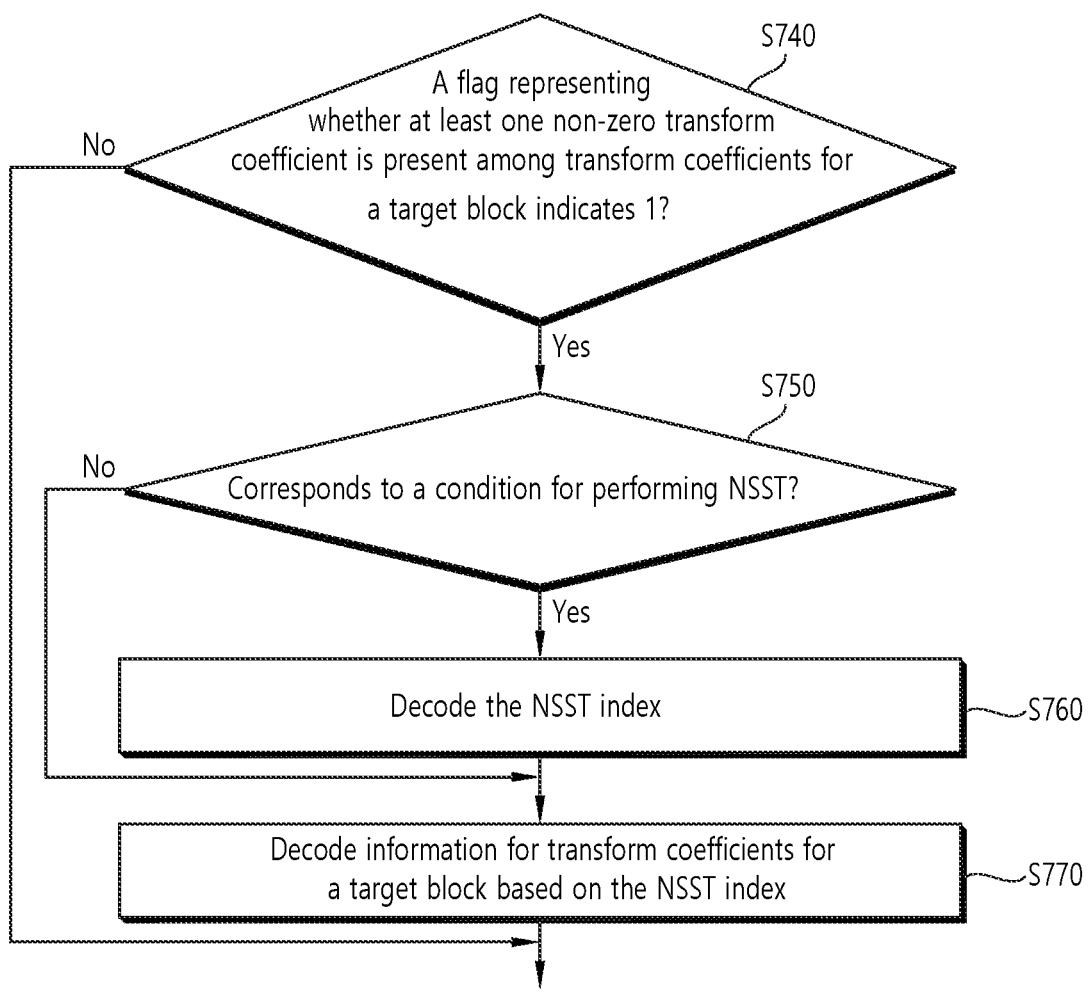

FIG. 7a and FIG. 7b are flowcharts illustrating a coding process of a transform coefficient according to an embodiment.

Each step shown in FIG. 7a and FIG. 7b may be performed by the encoding apparatus 100 or the decoding apparatus 300 shown in FIG. 1 and FIG. 3, respectively, and more particularly, performed by the entropy encoder 130 shown in FIG. 1 and the entropy decoder 310 shown in FIG. 3, respectively. Accordingly, the detailed description overlapped with the contents described in FIG. 1 or FIG. 3 is omitted or briefly described.

In this disclosure, a term or a sentence is used for defining specific information or concept. For example, in this disclosure, "a flag indicating whether at least one non-zero transform coefficient is present among transform coefficients for a target block" indicates a cbf. However, since "cbf" may be replaced by other various terms such as coded block flag and the like, when interpreting a term or a sentence used for defining specific information or concept throughout the disclosure, the term or the sentence should not be interpreted in a limited manner to the title, but it is required to interpret the term or the sentence by concentrating on various operations, functions and effects according to the meaning of the term.

FIG. 7a illustrates an encoding process of a transform coefficient.

The encoding apparatus 100 according to an embodiment may determine whether a flag indicating whether at least one non-zero transform coefficient is present among transform coefficients for a target block indicates 1 (step, S700). In the case that the flag indicating whether at least one non-zero transform coefficient is present among transform coefficients for a target block indicates 1, at least one non-zero transform coefficient may be present among transform coefficients for a target block. On the other hand, in the case that the flag indicating whether at least one non-zero transform coefficient is present among transform coefficients for a target block indicates 0, all the transform coefficients for a target block may indicate 0.

The flag indicating whether at least one non-zero transform coefficient is present among transform coefficients for a target block may be represented by a cbf flag. The cbf flag may include cbf_luma[x0][y0][trafoDepth] flag for a luma block and cbf_cb[x0][y0][trafoDepth] and cbf_cr[x0][y0][trafoDepth] flags for a chroma block. Here, the array indices x0 and y0 may mean positions of top-left luma/chroma samples of a target block for top-left luma/chroma samples of a current picture, and the array index trafoDepth may mean a level in which a coding block is partitioned for the purpose of transform coding. The blocks of which trafoDepth indicates 0 may correspond to a coding block, and in the case that a coding block and a transform block are defined identically, trafoDepth may be regarded as 0.

In the case that the flag indicating whether at least one non-zero transform coefficient is present among transform coefficients for a target block indicates 1 in step S700, the encoding apparatus 100 according to an embodiment may encode information for transform coefficients for a target block (step, S710).

The information for transform coefficients for a target block may include at least one of information for a position of the last transform coefficient, which is non-zero, group flag information indicating whether a non-zero transform coefficient is included in a sub-group of a target block and information for a reduced coefficient, for example. Detailed description for the information will be described below.

The encoding apparatus 100 according to an embodiment may determine whether it corresponds to a condition for perform NSST (step, S720). More particularly, the encoding apparatus 100 may determine whether it corresponds to a condition for encoding an NSST index. In this case, the NSST index may be called a transform index, for example.

In the case that the encoding apparatus 100 according to an embodiment determines that it corresponds to a condition for perform NSST in step S720, the encoding apparatus 100 may encode the NSST index (step, S730). More particularly, in the case that the encoding apparatus 100 according to an embodiment determines that it corresponds to a condition for encoding the NSST index, the encoding apparatus 100 may encode the NSST index.

In the case that the flag indicating whether at least one non-zero transform coefficient is present among transform coefficients for a target block indicates 0 in step S700, the encoding apparatus 100 according to an embodiment may omit the operations according to steps S710, S720 and S730.

In addition, in the case that the encoding apparatus 100 according to an embodiment may determine whether it does not correspond to a condition for perform NSST in step S720, the encoding apparatus 100 may omit the operation according to step S730.

FIG. 7b illustrates a decoding process of a transform coefficient.

The decoding apparatus 300 according to an embodiment may determine whether a flag indicating whether at least one non-zero transform coefficient is present among transform coefficients for a target block indicates 1 (step, S740). In the case that the flag indicating whether at least one non-zero transform coefficient is present among transform coefficients for a target block indicates 1, at least one non-zero transform coefficient may be present among transform coefficients for a target block. On the other hand, in the case that the flag indicating whether at least one non-zero transform coeffi-cient is present among transform coefficients for a target block indicates 0, all the transform coefficients for a target block may indicate 0.

In the case that the flag indicating whether at least one non-zero transform coefficient is present among transform coefficients for a target block indicates 1 in step S740, the decoding apparatus 300 according to an embodiment may encode information for transform coefficients for a target block (step, S750).

The decoding apparatus 300 according to an embodiment may determine whether it corresponds to a condition for perform NSST (step, S760). More particularly, the decoding apparatus 300 may determine whether it corresponds to a condition for decoding an NSST index from a bitstream.

In the case that the decoding apparatus 300 according to an embodiment determines that it corresponds to a condition for perform NSST in step S760, the decoding apparatus 300 may decode the NSST index (step, S770).

In the case that the flag indicating whether at least one non-zero transform coefficient is present among transform coefficients for a target block indicates 0 in step S740, the decoding apparatus 300 according to an embodiment may omit the operations according to steps S750, S760 and S770.

In addition, in the case that the decoding apparatus 300 according to an embodiment may determine whether it does not correspond to a condition for perform NSST in step S760, the decoding apparatus 300 may omit the operation according to step S770.

As described above, it may degrade a coding efficiency to signal the NSST index when NSST is not performed as described above. In addition, depending on a specific condition, a method for differentiating a coding method of the NSST index may improve overall coding efficiency of an image. Accordingly, the present disclosure proposes various NSST index coding methods.

For example, based on a specific condition, a range of the NSST index may be determined. In other words, based on a specific condition, a range of a value of the NSST index may be determined. Particularly, based on a specific condition, a maximum value of the NSST index may be determined.

For example, based on a block size, a range of a value of the NSST index may be determined. Here, the block size may be defined as a minimum (W, H). The W may represent a width, and H may represent a height. In this case, through a comparison between a width of a target block and the W and a comparison between a height of the target block and the minimum H, a range of a value of the NSST index may be determined.

Alternatively, the block size may be defined as the number of samples in a block (W*H). In this case, through a comparison between the number of samples of a target block W*H and a specific value, a range of a value of the NS ST index may be determined.

Alternatively, for example, based on a shape of a block, that is, a block type, a range of a value of the NSST index may be determined. Here, the block type may be defined as a square block or a non-square block. In this case, a range of a value of the NSST index may be determined based on whether a target block is a square block or a non-square block.

Alternatively, the block type may be defined as a ratio of a long side (long side between a width and a height) and a short side of a block. In this case, through a comparison between a ratio of a long side and a short side of a block and a preconfigured threshold value (e.g., 2 or 3), a range of a value of the NS ST index may be determined. Here, the ratio may represent a value of the short side divided by the long side. For example, in the case that a width of the target block is longer than a height, through a comparison between the value of the width divided by the height and the preconfigured threshold value, a range of a value of the NSST index may be determined. In addition, in the case that a height of the target block is longer than a width, through a comparison between the value of the height divided by the width and the preconfigured threshold value, a range of a value of the NS ST index may be determined.

Alternatively, as an example, based on an intra prediction mode applied to a block, a range of a value of the NSST index may be determined. For example, based on whether an intra prediction mode applied to the target block is a non-directional intra prediction mode or a directional intra prediction mode, a range of a value of the NSST index may be determined.

Alternatively, as another example, based on whether an intra prediction mode applied to the target block is an intra prediction mode included in category A or category B, a range of a value of the NSST index may be determined. Here, as an example, the category A may include No. 2 intra prediction mode, No. 10 intra prediction mode, No. 18 intra prediction mode, No. 26 intra prediction mode, No. 34 intra prediction mode, No. 42 intra prediction mode, No. 50 intra prediction mode, No. 58 intra prediction mode and No. 66 intra prediction mode, and the category B may include intra prediction modes except the intra prediction modes included in the category A. The intra prediction modes included in the category A may be preconfigured, and it may be preconfigured that the category A and the category B include intra prediction modes which are different from the example described above.

Alternatively, as another example, based on AMT factor of a block, a range of a value of the NSST index may be determined. The AMT factor may also be represented as MTS factor.

For example, the AMT factor may be defined as the AMT flag described above. In this case, based on a value of the AMT flag of the target block, a range of a value of the NSST index may be determined.

Alternatively, the AMT factor may be defined as the AMT vertical flag and/or the AMT horizontal flag described above. In this case, based on a value of the AMT vertical flag and/or the AMT horizontal flag of the target block, a range of a value of the NSST index may be determined.

Alternatively, the AMT factor may be defined as a transform kernel which is applied in the multi-core transform. In this case, based on the transform kernel applied in the multi-core transform of the target block, a range of a value of the NS ST index may be determined.

Alternatively, as another example, based on a component of a block, a range of a value of the NSST index may be determined. For example, a range of a value of the NSST index for a luma block of the target block and a range of a value of the NS ST index for a chroma block of the target block may be differently applied.

Meanwhile, through a combination of the specific conditions described above, a range of a value of the NS ST index may be determined.

A range of a value of the NSST index determined based on the specific condition, that is, a maximum value of the NS ST index may be configured in various manners.

For example, based on the specific condition, the maximum value of the NS ST index may be determined to be R1, R2 or R3. Particularly, in the case that the specific condition corresponds to category A, the maximum value of the NSST index may be derived as R1. In the case that the specific condition corresponds to category B, the maximum value of the NSST index may be derived as R2. In the case that the specific condition corresponds to category C, the maximum value of the NSST index may be derived as R3.

R1 for the category A, R2 for the category B and R3 for the category C may be derived as represented in the following Table.

TABLE 5

|  | Maximum NSST Idx |
| --- | --- |
| Category A | R1 |
| Category B | R2 |
| Category C | R3 |
| ... | ... |

R1, R2 and R3 may be preconfigured. For example, a relationship among R1, R2 and R3 may be derived as represented in the following Equation.

$$0<=R1<R2<R3< \qquad \text{[Equation 4]}$$

Referring to Equation 4, R1 may be equal to or greater than 0, R2 may be greater than R1, and R3 may be greater than R2. Meanwhile, in the case that R2 is 0, and in the case that the maximum value of the NSST index is determined to be R1, the NSST index may not be signaled, and a value of the NSST index may be inferred as 0.

In addition, in the present disclosure, an implicit NSST index coding method is proposed.

Generally, in the case that NSST is applied, a distribution of non-zero transform coefficients among transform coefficients may be changed. Particularly, in the case that reduced secondary transform (RST) to a secondary transform is used in a specific condition, an NSST index may not be coded.

Here, the RST may represent a secondary transform that uses a reduced transform matrix as a non-separable transform matrix, and the reduced transform matrix may be determined such that an N dimensional vector is mapped to a R dimensional vector located in different space. Here, R is smaller than N. The N may mean a square of a length of a side of a block to which transform is applied or total number of transform coefficients corresponding to a block to which transform is applied. A reduced factor may mean R/N value. The reduced factor may be called by various terms such as a simplification factor, a reduction factor, simplified factor, simple factor, and the like. Meanwhile, the R may be called a reduced coefficient, but in some cases, the reduced factor may mean the R. In addition, in some cases, the reduced factor may mean N/R value.

A size of the reduced transform matrix according to an embodiment may be R×N which is smaller than a size N×N of a common transform matrix and may be defined as represented in Equation 5 below.

$$T_{R \times N} = \begin{bmatrix} t_{11} & t_{12} & t_{13} & & t_{1N} \\ & & & \cdots & \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \qquad \text{[Equation 5]}$$

When a reduced transform matrix $T_{R \times N}$ is multiplied to the transform coefficients to which a primary transform of a target block is applied, (secondary) transform coefficients for the target block may be derived.

In the case that the RST is applied, since the reduced transform matrix of R×N size is applied to the secondary transform, transform coefficients from R+1 to N may be 0 implicitly. In other words, in the case that the RST is applied, and the transform coefficient of the target block is derived, transform coefficients from R+1 to N may be 0. Here, the transform coefficients from R+1 to N may represent transform coefficients from R+1$^{th}$ transform coefficient to N$^{th}$ transform coefficient. Particularly, an array of transform coefficients of the target block may be described as below.

Figure 8:
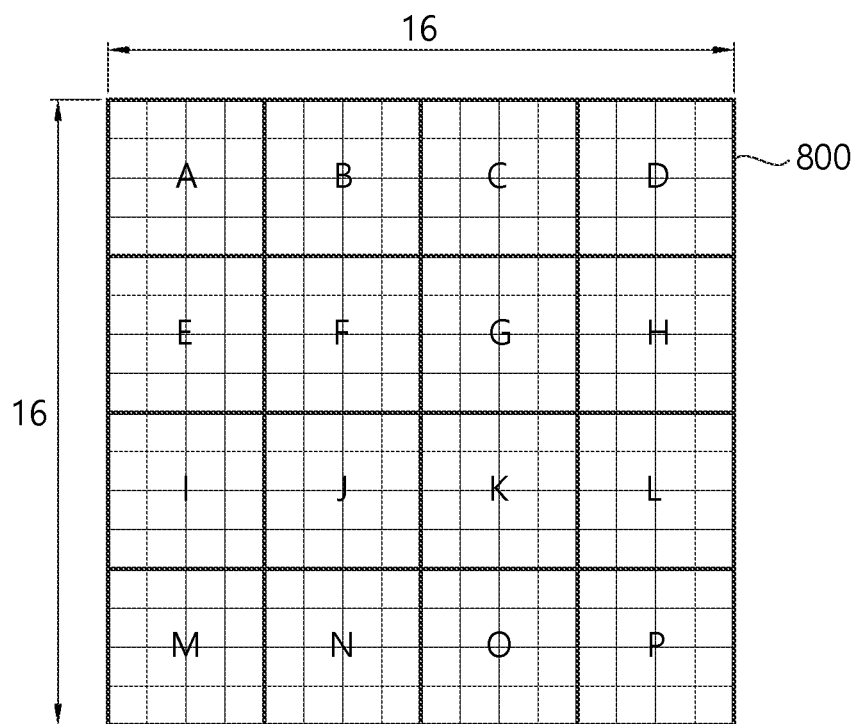
FIG. 8 is a diagram for describing an array of transform coefficients based on a target block according to an embodiment of the present disclosure.

FIG. 8 is a diagram for describing an array of transform coefficients based on a target block according to an embodiment of the present disclosure. Hereinafter, the description for the transform in FIG. 8 described below may also be applied to an inverse transform in the same manner. For a target block (or residual block, 800), NS ST (an example of a secondary transform) based on a primary transform and a reduced transform may be performed. In an example, the 16×16 block shown in FIG. 8 may represent the target block 800, and 4×4 blocks denoted by A to P may represent sub-groups of the target block 800. The primary transform may be performed in the whole range of the target block 800. After the primary transform is performed, NSST may be applied to 8×8 block (hereinafter, top-left target area) constructed by sub-groups A, B, E and F. In this case, when NSST based on the reduced transform is performed, since only R NSST transform coefficients (herein, R means a reduced coefficient, and R is smaller than N) are derived, each of the NS ST transform coefficients in the R+1$^{th}$ to N$^{th}$ range may be determined to be 0. In the case that R is 16, for example, 16 transform coefficients to which NS ST based on the reduced transform is performed, which is derived, may be allocated to each of the blocks included in sub-group A, which is a top-left 4×4 block included in the top-left target area of the target block 800, and transform coefficient 0 may be allocated to each of N-R blocks, that is, 64−16=48 groups, included in sub-group B, E and F. The primary transform coefficients to which NSST based on the reduced transform is not performed may be allocated to each of the blocks included in sub-groups C, D, G, H, I, J, K, L, M, N, O and P.

Accordingly, in the case that transform coefficients from R+1 to N are scanned and any one non-zero transform coefficient is derived, it may be determined that the RST is not applied, and a value of the NSST index may be 0 implicitly without any separate signaling. That is, in the case that transform coefficients from R+1 to N are scanned and any one non-zero transform coefficient is derived, the RST may not be applied, and a value of the NS ST index may be derived as 0 without any separate signaling.

Figure 9:
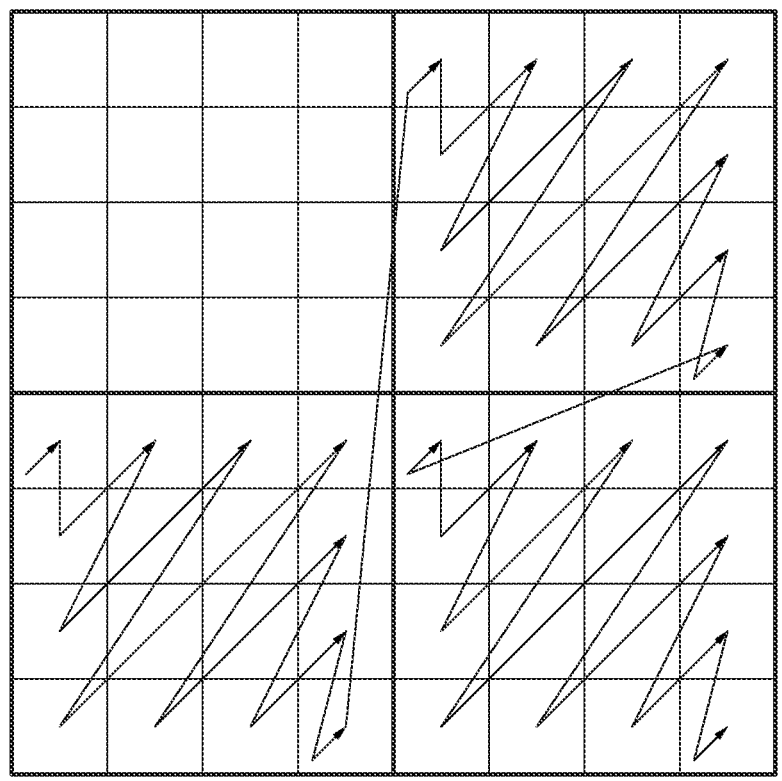
FIG. 9 illustrates an example of scanning transform coefficients from R+1 to N.

FIG. 9 illustrates an example of scanning transform coefficients from R+1 to N.

Referring to FIG. 9, a size of a target block to which transform is applied may be 64×64, and R=16 (i.e., R/N=$^{16}$/$_{64}$=¼). That is, FIG. 9 shows a top-left target area of the target block. A reduced transform matrix of 16×64 size may be applied to a secondary transform for 64 samples of the top-left target area of the target block. In this case, when the RST is applied to the top-left target area, a value of transform coefficients from 17 to 64 (N) needs to be 0. In other words, in the case that any one non-zero transform coefficient is derived from 17 to 64 transform coefficients of the target block, the RST may not be applied, and a value of the NSST index may be derived as without any separate signaling. Accordingly, the decoding apparatus may decode the transform coefficient of the target block and scan the transform coefficients from 17 to 64 among the decoded transform coefficients. In the case that a non-zero transform coefficient is derived, the decoding apparatus may derive a value of the NSST index as 0 without any separate signaling. Meanwhile, in the case that a non-zero transform coefficient is not existed among 17 to 64 transform coefficients, the decoding apparatus may receive and decode the NSST index.

Figure 10A:
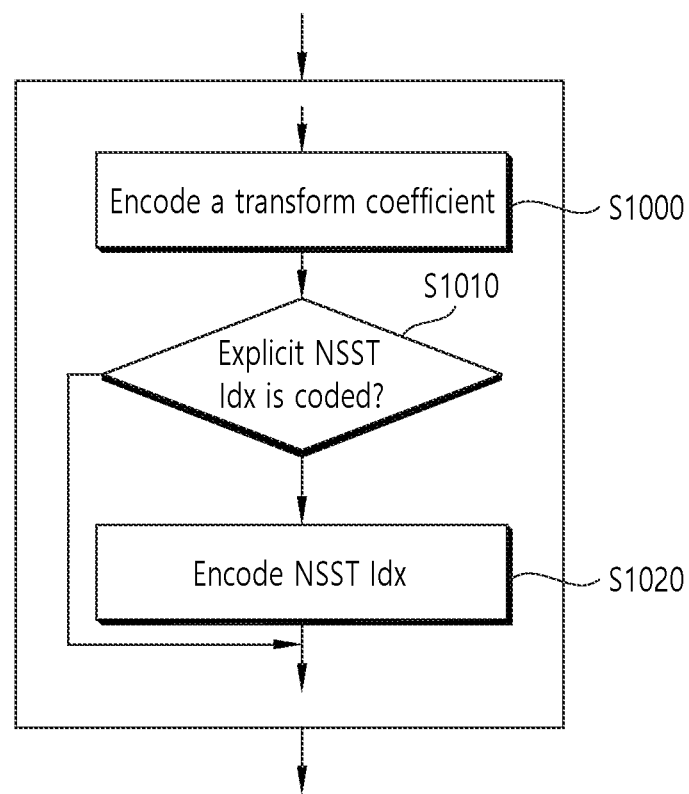
FIG. 10a and FIG. 10b are flowcharts illustrating a coding process of an NSST index according to an embodiment.
Figure 10B:
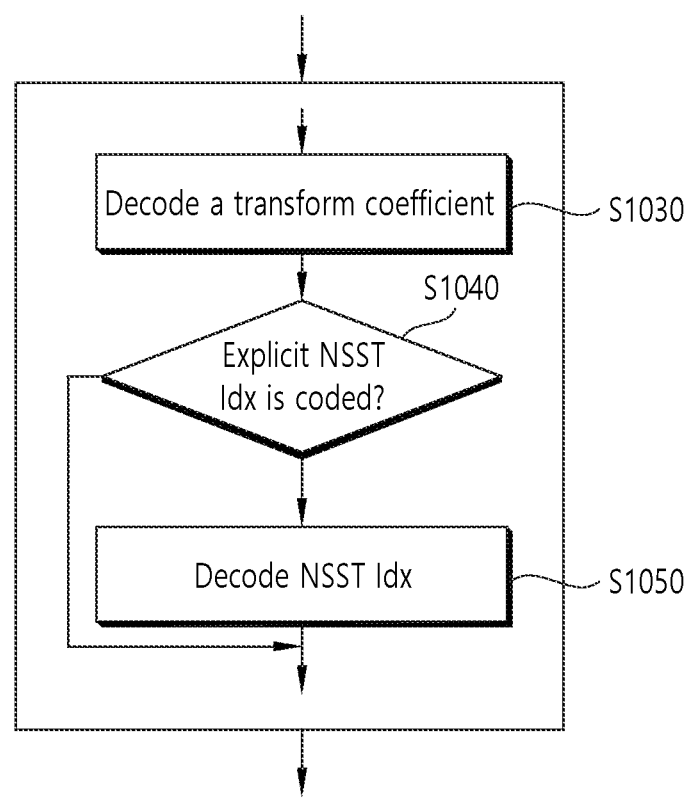

FIG. 10a and FIG. 10b are flowcharts illustrating a coding process of an NSST index according to an embodiment.

FIG. 10a shows an encoding process of an NSST index.

The encoding apparatus may encode a transform coefficient for a target block (step, S1000). The encoding apparatus may perform entropy encoding for quantized transform coefficients. The entropy encoding may include an encoding method such as exponential Golomb, context-adaptive variable length coding (CAVLC), context-adaptive binary arithmetic coding (CABAC), and the like.

The encoding apparatus may determine whether an (explicit) NSST index for the target block is coded (step, S1010). Here, the (explicit) NSST index may represent the NSST index transferred to the decoding apparatus. That is, the encoding apparatus may determine whether to generate the NSST index which is signaled. In other words, the encoding apparatus may determine whether to allocate a bit for a syntax element for the NSST index. As described in the embodiment, in the case that the decoding apparatus may derived a value of the NSST index without the NSST index being signaled, the encoding apparatus may not code the NSST index. The detailed process of determining whether the NSST index is coded is as described below.

In the case that it is determined that the (explicit) NSST index is coded, the encoding apparatus may encode the NSST index (step, S1020).

FIG. 10b shows a decoding process of an NSST index.

The decoding apparatus may decode a transform coefficient for a target block (step, S1030).

The decoding apparatus may determine whether an (explicit) NSST index for the target block is coded (step, S1040). Here, the (explicit) NSST index may represent the NSST index signaled from the encoding apparatus. As described in the embodiment, in the case that the decoding apparatus may derived a value of the NS ST index without the NS ST index being signaled, the NSST index may not be signaled from the encoding apparatus. The detailed process of determining whether the NS ST index is coded is as described below.

In the case that it is determined that the (explicit) NSST index is coded, the decoding apparatus may encode the NSST index (step, S1040).

Figure 11:
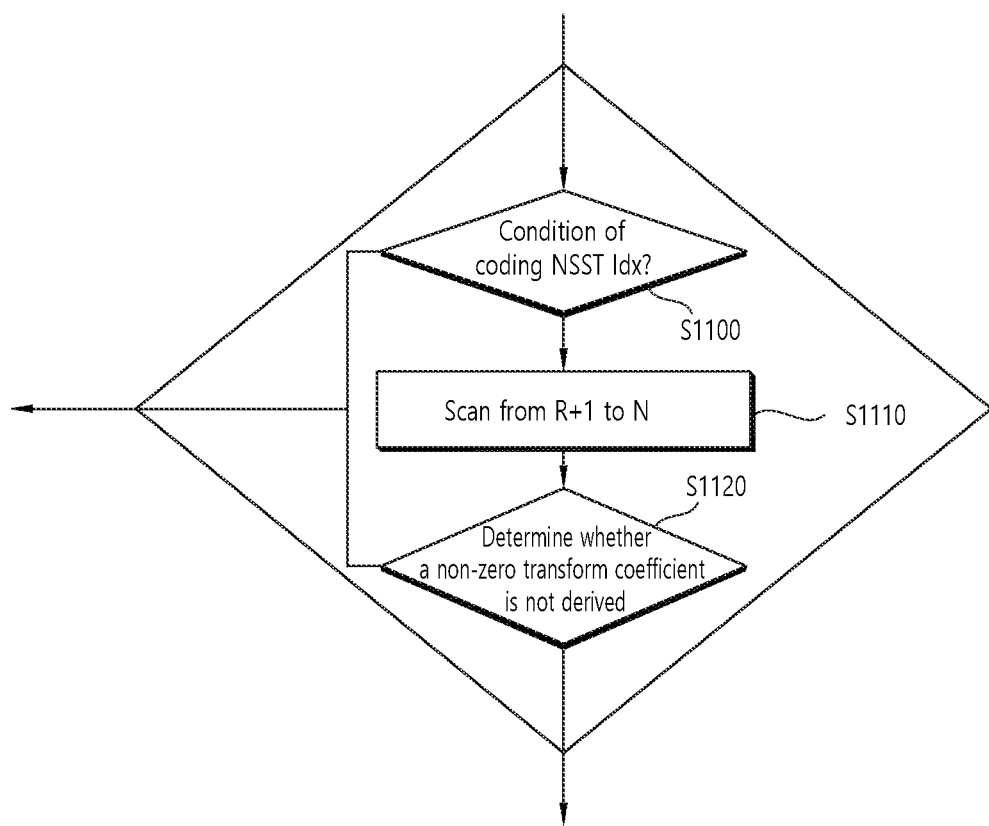
FIG. 11 illustrates an example of determining whether an NSST index is coded.

FIG. 11 illustrates an example of determining whether an NSST index is coded.

The encoding apparatus/decoding apparatus may determine whether it corresponds to a condition of coding an NS ST index for a target block (step, S1100). For example, in the case that cbf flag for the target block indicates 0, the encoding apparatus/decoding apparatus may determine not to code the NSST index for the target block. Alternatively, in the case that the target block is coded with a transform skip mode or the number of non-zero transform coefficients among the transform coefficients for the target block is smaller than a preconfigured threshold value, the encoding apparatus/decoding apparatus may determine not to code the NSST index for the target block. For example, the preconfigured threshold value may be 2.

In the case that it corresponds to a condition of coding the NS ST index for the target block, the encoding apparatus/decoding apparatus may scan transform coefficients from R+1 to N (step, S1110). The transform coefficients from R+1 to N may represent transform coefficients from $R+1^{th}$ to $N^{th}$ on a scan order among the transform coefficients.

The encoding apparatus/decoding apparatus may determine whether a non-zero transform coefficient is derived among the transform coefficients from R+1 to N (step, S1120). In the case that a non-zero transform coefficient is derived among the transform coefficients from R+1 to N, the encoding apparatus/decoding apparatus may determine not to code the NSST index for the target block. In this case, encoding apparatus/decoding apparatus may derive the NSST index for the target block as 0. In other words, for example, in the case that the NS ST index of which value is 0 indicates that NSST is not applied, the encoding apparatus/decoding apparatus may not perform NS ST for the top-left target area of the target block.

Meanwhile, in the case that a non-zero transform coefficient is not derived among the transform coefficients from R+1 to N, the encoding apparatus may encode the NS ST index for the target block, and the decoding apparatus may decode the NS ST index for the target block.

Meanwhile, it may be proposed a method for components (a luma component, a chroma Cb component and a chroma Cr component) to use a common NSST index.

For example, the same NS ST index may be used for a chroma Cb component of the target block and a chroma Cr component of the target block. In addition, as another example, the same NSST index may be used for a luma component of the target block, a chroma Cb component of the target block and a chroma Cr component of the target block.

In the case that two or three components of the target block use the same NS ST index, the encoding apparatus may scan transform coefficients from R+1 to N of all components (a luma block, a chroma Cb block and a chroma Cr block of the target block), and in the case that at least one non-zero coefficient is derived, the encoding apparatus may not encode the NSST index but derive a value of the NSST index as 0. In addition, the decoding apparatus may scan transform coefficients from R+1 to N of all components (a luma block, a chroma Cb block and a chroma Cr block of the target block), and in the case that at least one non-zero coefficient is derived, the decoding apparatus may not decode the NSST index but derive a value of the NS ST index as 0.

FIG. 12 illustrates an example of scanning transform coefficients from R+1 to N for all components of a target block.

Referring to FIG. 12, a size of a luma block, a chroma Cb block and a chroma Cr block of a target block to which transform is applied may be 64×64, and R=16 (i.e., R/N=16/64=1/4). That is, FIG. 12 shows a top-left target area of the luma block, a top-left target area of the chroma Cb block and a top-left target area of the chroma Cr block. Accordingly, a reduced transform matrix of 16×64 size may be applied to a secondary transform for each of 64 samples of a top-left target area of the luma block, a top-left target area of the chroma Cb block and a top-left target area of the chroma Cr block. In this case, when the RST is applied to a top-left target area of the luma block, a top-left target area of the chroma Cb block and a top-left target area of the chroma Cr block, a value of transform coefficients from 17 to 64 (N) needs to be 0. In other words, in the case that any one non-zero transform coefficient is derived from 17 to 64 transform coefficients of the target block, the RST may not be applied, and a value of the NSST index may be derived as 0 without any separate signaling. Accordingly, the decoding apparatus may decode the transform coefficient of all components of the target block and scan the transform coefficients from 17 to 64 of the luma block, the chroma Cb block and the chroma Cr block among the decoded transform coefficients. In the case that a non-zero transform coefficient is derived, the decoding apparatus may derive a value of the NSST index as 0 without any separate signaling. Meanwhile, in the case that a non-zero transform coefficient is not existed among 17 to 64 transform coefficients, the decoding apparatus may receive and decode the NSST index. The NSST index may be used for an index for the luma block, the chroma Cb block and the chroma Cr block.

In addition, in the present disclosure, it may be proposed a method for signaling an NSST index indicator in a higher level. NSST_Idx_indicator may represent a syntax element for the NSST index indicator. For example, the NSST index indicator may be coded with Coding Tree Unit (CTU) level, and the NSST index indicator may represent whether NSST is applied to a target CTU. That is, the NSST index indicator may represent whether NSST is available for a target CTU. Particularly, in the case that the NS ST index indicator is enabled for the target CTU (in the case that NSST is available for the target CTU), that is, in the case that a value of the NSST index indicator is 1, an NS ST index for a CU or a TU included in the target CTU may be coded. In the case that the NSST index indicator is disabled for the target CTU (in the case that NSST is unavailable for the target CTU), that is, in the case that a value of the NSST index indicator is 0, an NS ST index for a CU or a TU included in the target CTU may not be coded. Meanwhile, the NSST index indicator may be coded with a CTU level as described above or coded with a sample group level of different arbitrary size. For example, the NSST index indicator may be coded with a Coding Unit (CU) level.

Figure 13:
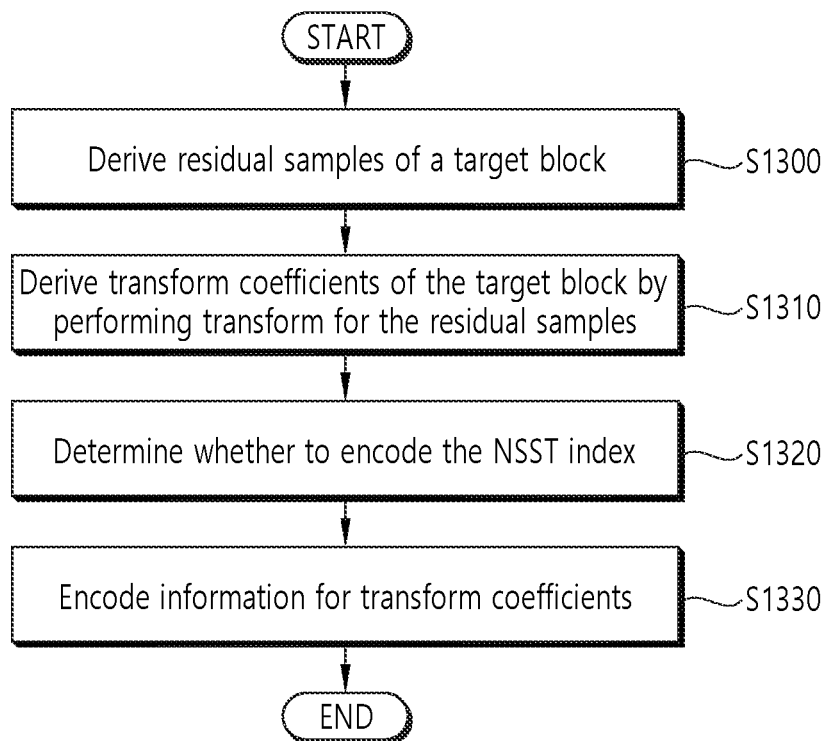
FIG. 13 schematically illustrates a video encoding method by an encoding apparatus according to the present disclosure.

FIG. 13 schematically illustrates a video encoding method by an encoding apparatus according to the present disclosure. The method shown in FIG. 13 may be performed by the encoding apparatus shown in FIG. 1. Particularly, for example, step S1300 of FIG. 13 may be performed by the subtractor the encoding apparatus, step S1310 may be performed by the transformer of the encoding apparatus, and steps S1320 to S1330 may be performed by the entropy encoder of the encoding apparatus. In addition, although it is not shown, the process of deriving a prediction sample may be performed by the predictor of the encoding apparatus.

The encoding apparatus derives residual samples of a target block (step, S1300). For example, the encoding apparatus may determine whether to perform an inter prediction or an intra prediction for the target block and determine a specific inter prediction mode or a specific intra prediction mode based on RD cost. According to the encoding apparatus may derive prediction samples for the target block and derive the residual samples through a summation of original samples for the target block and the prediction samples.

The encoding apparatus derives transform coefficients of the target block by performing transform for the residual samples (step, S1310). The encoding apparatus may determine whether to apply NS ST for the target block.

In the case that the NS ST is applied to the target block, the encoding apparatus may derive modified transform coefficients by performing a core transform for the residual samples and derive the transform coefficients of the target block by performing NSST for the modified transform coefficients located in a top-left target area of the target block based on a reduced transform matrix. The modified transform coefficients except the modified transform coefficients located in the top-left target area of the target block may be derived as the transform coefficients of the target block without any change. A size of the reduced transform matrix may be R×N. Herein, the N may be the number of samples in the top-left target area, and the R may be a reduced coefficient. The R may be smaller than N.

Particularly, the core transform for the residual samples may be performed as below. The encoding apparatus may determine whether to apply Adaptive Multiple core Transform (AMT) for the target block. In this case, an AMT flag may be generated, which represents whether the Adaptive Multiple core Transform is applied to the target block. In the case that the AMT is not applied to the target block, the encoding apparatus may derive DCT type 2 as a transform kernel for the target block and derive the modified transform coefficients by performing transform for the residual samples based on DCT type 2.

In the case that the AMT is applied to the target block, the encoding apparatus may configure a transform subset for a horizontal transform kernel and a transform subset for a vertical transform kernel, derive a horizontal transform kernel and a vertical transform kernel based on the transform subsets, and derive modified transform coefficients by performing transform for the residual samples based on the horizontal transform kernel and the vertical transform kernel. Here, the transform subset for the horizontal transform kernel and the transform subset for the vertical transform kernel may include DCT type 2, DCT type 7, DCT type 8 and/or DCT type 1 as a candidate. In addition, transform index information may be generated, and the transform index information may include an AMT horizontal flag indicating the horizontal transform kernel and an AMT vertical flag indicating the vertical transform kernel. Meanwhile, the transform kernel may be called a transform type or a transform core.

Meanwhile, in the case that the NSST is not applied to the target block, the encoding apparatus may derive the transform coefficients of the target block by performing a core transform for the residual samples.

Particularly, the core transform for the residual samples may be performed as below. The encoding apparatus may determine whether to apply Adaptive Multiple core Transform (AMT) for the target block. In this case, an AMT flag may be generated, which represents whether the Adaptive Multiple core Transform is applied to the target block. In the case that the AMT is not applied to the target block, the encoding apparatus may derive DCT type 2 as a transform kernel for the target block and derive the modified transform coefficients by performing transform for the residual samples based on DCT type 2.

In the case that the AMT is applied to the target block, the encoding apparatus may configure a transform subset for a horizontal transform kernel and a transform subset for a vertical transform kernel, derive a horizontal transform kernel and a vertical transform kernel based on the transform subsets, and derive modified transform coefficients by performing transform for the residual samples based on the horizontal transform kernel and the vertical transform kernel. Here, the transform subset for the horizontal transform kernel and the transform subset for the vertical transform kernel may include DCT type 2, DCT type 7, DCT type 8 and/or DCT type 1 as a candidate. In addition, transform index information may be generated, and the transform index information may include an AMT horizontal flag indicating the horizontal transform kernel and an AMT vertical flag indicating the vertical transform kernel. Meanwhile, the transform kernel may be called a transform type or a transform core.

The encoding apparatus determines whether to encode the NSST index (step, S1320).

As an example, the encoding apparatus may scan from $R+1^{th}$ to $N^{th}$ transform coefficients among transform coefficients of the target block. In the case that a non-zero transform coefficient is included in the $R+1^{th}$ to $N^{th}$ transform coefficients, the encoding apparatus may determine not to encode the NSST index. Herein, the N may be the number of samples in the top-left target area, and the R may be a reduced coefficient. The R may be smaller than N. The N may be derived as a multiplication of a width and a height of the top-left target area.

In addition, in the case that a non-zero transform coefficient is not included in the $R+1^{th}$ to $N^{th}$ transform coefficients, the encoding apparatus may determine to encode the NSST index. In this case, information for the transform coefficients may include a syntax element for the NS ST index. That is, the syntax element for the NSST index may be encoded. In other words, a bit for the syntax element for the NS ST index may be allocated.

Meanwhile, the encoding apparatus may determine whether it corresponds to a condition that the NS ST is available to be performed. In the case that the NSST is available to be performed, the encoding apparatus may determine to encode the NSST index for the target block. For example, from a bitstream, an NSST index indicator for a target CTU including the target block may be generated, and the NSST index indicator may represent whether NSST is applied to the target CTU. In the case that a value of the NSST index indicator is 1, the encoding apparatus may determine to encode the NSST index for the target block, and in the case that a value of the NSST index indicator is 0, the encoding apparatus may determine not to encode the NSST index for the target block. As described in the example above, the NSST index indicator may be signaled with a CTU level, or the NS ST index indicator may be signaled with a CU level or other higher level.

In addition, the NSST index may be used for a plurality of components of the target block.

For example, the NSST index may be used for inverse transform for transform coefficients of a luma block of the target block, transform coefficients of a chroma Cb block of the target block and transform coefficients of a chroma Cr block of the target block. In this case, $R+1^{th}$ to $N^{th}$ transform coefficients of the luma block, $R+1^{th}$ to $N^{th}$ transform coefficients of the chroma Cb block and $R+1^{th}$ to $N^{th}$ transform coefficients of the chroma Cr block may be scanned. In the case that a non-zero transform coefficient is included in the scanned transform coefficients, it may be determined that the NSST index is not encoded. In the case that a non-zero transform coefficient is not included in the scanned transform coefficients, it may be determined that the NS ST index is encoded. In this case, information for the transform coefficients may include a syntax element for the NS ST index. That is, the syntax element for the NS ST index may be encoded. In other words, a bit for the syntax element for the NS ST index may be allocated.

As another example, the NSST index may be used for inverse transform for transform coefficients of a luma block of the target block and transform coefficients of a chroma Cb block of the target block. In this case, $R+1^{th}$ to $N^{th}$ transform coefficients of the luma block and $R+1^{th}$ to $N^{th}$ transform coefficients of the chroma Cb block may be scanned. In the case that a non-zero transform coefficient is included in the scanned transform coefficients, it may be determined that the NS ST index is not encoded. In the case that a non-zero transform coefficient is not included in the scanned transform coefficients, it may be determined that the NSST index is encoded. In this case, information for the transform coefficients may include a syntax element for the NSST index. That is, the syntax element for the NSST index may be encoded. In other words, a bit for the syntax element for the NS ST index may be allocated.

As another example, the NSST index may be used for inverse transform for transform coefficients of a luma block of the target block and transform coefficients of a chroma Cr block of the target block. In this case, $R+1^{th}$ to $N^{th}$ transform coefficients of the luma block and $R+1^{th}$ to $N^{th}$ transform coefficients of the chroma Cr block may be scanned. In the case that a non-zero transform coefficient is included in the scanned transform coefficients, it may be determined that the NS ST index is not encoded. In the case that a non-zero transform coefficient is not included in the scanned transform coefficients, it may be determined that the NSST index is encoded. In this case, information for the transform coefficients may include a syntax element for the NSST index. That is, the syntax element for the NSST index may be encoded. In other words, a bit for the syntax element for the NS ST index may be allocated.

Meanwhile, based on a specific condition, a range of the NSST index may be derived. For example, based on the specific condition, a maximum value of the NS ST index may be derived, and the range may be derived from 0 to the derived maximum value. The value of the derived NS ST index may be included in the range.

For example, based on a size of the target block, a range of the NS ST index may be derived. Particularly, a minimum width and a minimum height may be preconfigured. Based on the minimum width and a width of the target block, the minimum height and a height of the target block, a range of the NSST index may be derived. In addition, based on a specific value or a sample number of the target block, a range of the NSST index may be derived. The sample number may be a value of multiplying a width and a height of the target block, and the specific value may be preconfigured.

In addition, as another example, based on a type of the target block, a range of the NSST index may be derived. Particularly, a range of the NS ST index may be derived based on whether the target block is a non-square block. In addition, a range of the NSST index may be derived based on a ratio between a width and a height of the target block and a specific value. The ratio between a width and a height of the target block may be a value of a long side between the width and the height of the target block divided by a short side, and the specific value may be preconfigured.

In addition, as another example, based on an intra prediction mode of the target block, a range of the NSST index may be derived. Particularly, a range of the NSST index may be derived based on whether the intra prediction mode of the target block is a non-directional intra prediction mode or a directional intra prediction mode. In addition, based on whether an intra prediction mode of the target block is an intra prediction mode included in category A or category B, a range of a value of the NSST index may be determined. Here, the intra prediction mode included in category A and the intra prediction mode included in category B may be preconfigured. As an example, the category A may include No. 2 intra prediction mode, No. 10 intra prediction mode, No. 18 intra prediction mode, No. 26 intra prediction mode, No. 34 intra prediction mode, No. 42 intra prediction mode, No. 50 intra prediction mode, No. 58 intra prediction mode and No. 66 intra prediction mode, and the category B may include intra prediction modes except the intra prediction modes included in the category A.

In addition, as another example, based on information for a core transform of the target block, a range of the NS ST index may be derived. For example, a range of the NS ST index may be derived based on an AMT flag that represents whether Adaptive Multiple core Transform (AMT) is applied. In addition, a range of the NSST index may be derived based on an AMT horizontal flag indicating a horizontal transform kernel and an AMT vertical flag indicating a vertical transform kernel.

Meanwhile, in the case that a value of the NS ST index is 0, the NS ST index may indicate that NSST is not applied to the target block.

The encoding apparatus encodes information for transform coefficients (step, S1330). The information for transform coefficients may include information for a size, a position, and the like of the transform coefficients. In addition, as described above, the information for transform coefficients may further include the NS ST index, the transform index information and/or the AMT flag. Image information including the information for transform coefficients may be output in a bitstream format. In addition, the image information may further include the NSST index indicator and/or prediction information. The prediction information are information related to the prediction process and may include prediction mode information and information for motion information (e.g., for the case that inter prediction is applied).

The output bitstream may be forwarded to the decoding apparatus through a storage medium or a network.

Figure 14:
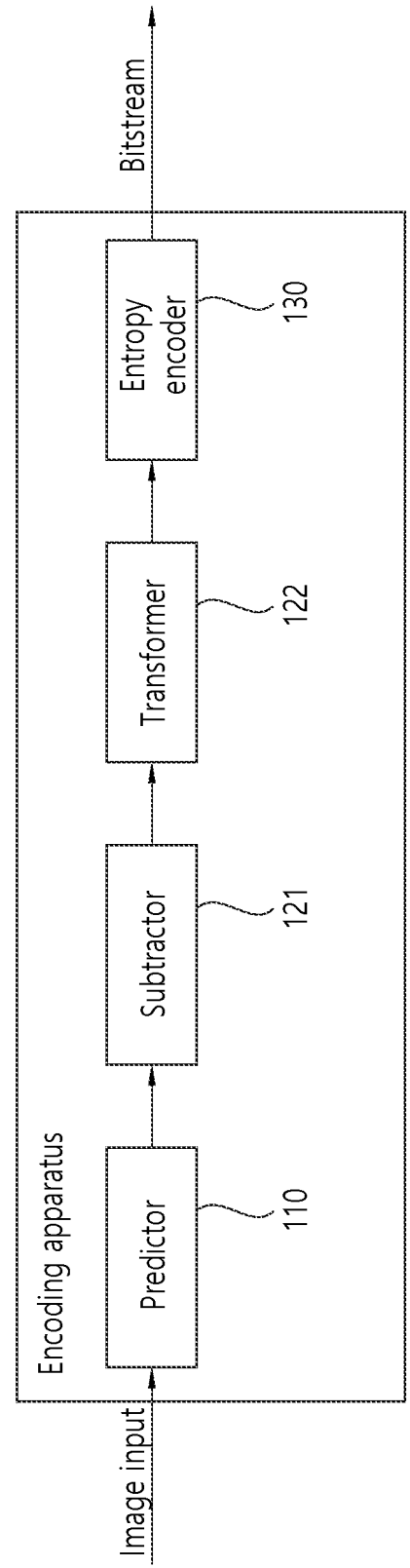
FIG. 14 schematically illustrates an encoding apparatus performing a video encoding method according to the present disclosure.

FIG. 14 schematically illustrates an encoding apparatus performing a video encoding method according to the present disclosure. The method shown in FIG. 13 may be performed by the encoding apparatus shown in FIG. 14. Particularly, for example, the adder of the encoding apparatus may perform step S1300 of FIG. 13, the transformer of the encoding apparatus may perform step S1310, and the entropy encoder of the encoding apparatus may perform steps S1320 to S1330. In addition, although it is not shown, the process of deriving a prediction sample may be performed by the predictor of the encoding apparatus.

Figure 15:
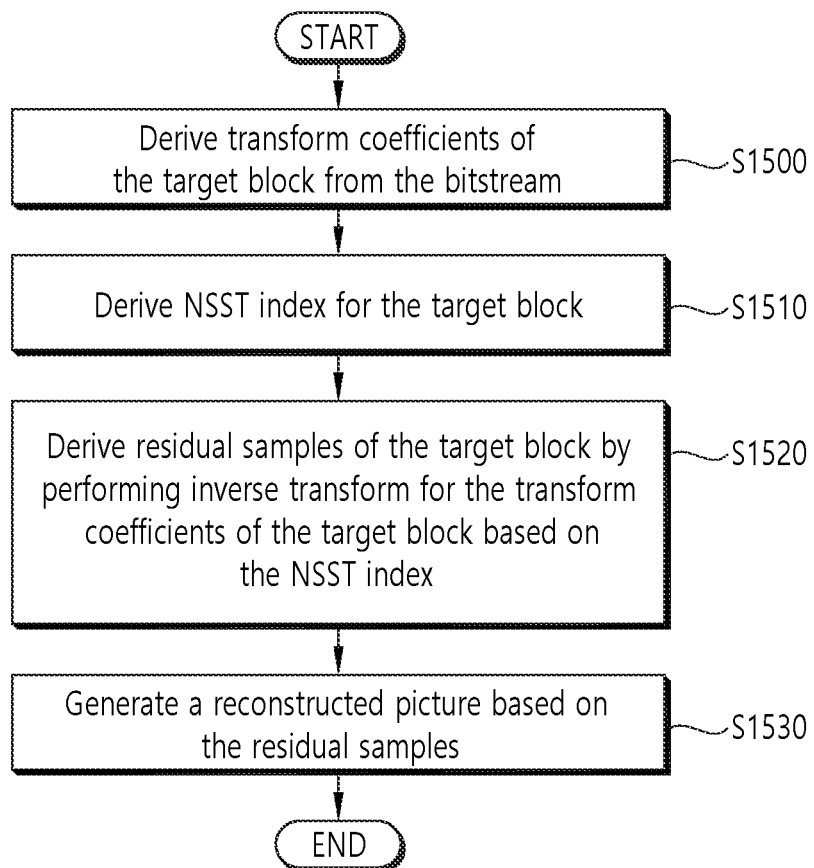
FIG. 15 schematically illustrates a video decoding method by a decoding apparatus according to the present disclosure.

FIG. 15 schematically illustrates a video decoding method by a decoding apparatus according to the present disclosure. The method shown in FIG. 15 may be performed by the decoding apparatus shown in FIG. 3. Particularly, for example, steps S1500 to S1510 of FIG. 15 may be performed by the entropy decoder the decoding apparatus, step S1520 may be performed by the inverse transformer of the decoding apparatus, and step S1530 may be performed by the adder of the decoding apparatus. In addition, although it is not shown, the process of deriving a prediction sample may be performed by the predictor of the decoding apparatus.

The decoding apparatus derives transform coefficients of the target block from the bitstream (step, S1500). The decoding apparatus may decode the information for the transform coefficients of the target block received from the bitstream and derive transform coefficients of the target block. The received information for the transform coefficients of the target block may be represented as residual information.

Meanwhile, the transform coefficients of the target block may include transform coefficients of a luma block of the target block, transform coefficients of a chroma Cb block of the target block and transform coefficients of a chroma Cr block of the target block.

The decoding apparatus derives a Non-Separable Secondary Transform (NSST) index for the target block (step, S1510).

As an example, the decoding apparatus may scan $R+1^{th}$ to $N^{th}$ transform coefficients among the transform coefficients of the target block. In the case that a non-zero transform coefficient is included in the $R+1^{th}$ to $N^{th}$ transform coefficients, the decoding apparatus may derive a value of the NSST index as 0. Here, the N is a sample number of a top-left target area of the target block, and the R is a reduced coefficient, and the R may be smaller than the N. The N may be derived as a multiplication of a width and a height of the top-left target area.

In addition, in the case that a non-zero transform coefficient is not included in the $R+1^{th}$ to $N^{th}$ transform coefficients, the decoding apparatus may parse a syntax element for the NSST index and derive a value of the NSST index. That is, in the case that a non-zero transform coefficient is not included in the $R+1^{th}$ to $N^{th}$ transform coefficients, the bitstream may include the syntax element for the NS ST index, and the decoding apparatus may parse the syntax element for the NSST index and derive a value of the NSST index.

Meanwhile, the decoding apparatus may determine whether it corresponds to a condition that the NS ST is available to be performed. In the case that the NSST is available to be performed, the decoding apparatus may derive the NSST index for the target block. For example, from a bitstream, an NSST index indicator for a target CTU including the target block may be signaled, and the NS ST index indicator may represent whether NS ST is enabled in the target CTU. In the case that a value of the NSST index indicator is 1, the decoding apparatus may derive the NSST index for the target block, and in the case that a value of the NS ST index indicator is 0, the decoding apparatus may not derive the NS ST index for the target block. As described in the example above, the NSST index indicator may be signaled with a CTU level, or the NS ST index indicator may be signaled with a CU level or other higher level.

In addition, the NSST index may be used for a plurality of components of the target block.

For example, the NS ST index may be used for inverse transform for transform coefficients of a luma block of the target block, transform coefficients of a chroma Cb block of the target block and transform coefficients of a chroma Cr block of the target block. In this case, $R+1^{th}$ to $N^{th}$ transform coefficients of the luma block, R+1th to $N^{th}$ transform coefficients of the chroma Cb block and $R+1^{th}$ to $N^{th}$ transform coefficients of the chroma Cr block may be scanned. In the case that a non-zero transform coefficient is included in the scanned transform coefficients, a value of the NSST index may be derived as 0. In the case that a non-zero transform coefficient is not included in the scanned transform coefficients, the bitstream may include a syntax element for the NSST index, and a value of the NSST index may be derived by parsing the syntax element for the NS ST index received through a bitstream.

As another example, the NSST index may be used for inverse transform for transform coefficients of a luma block of the target block and transform coefficients of a chroma Cb block of the target block. In this case, $R+1^{th}$ to $N^{th}$ transform coefficients of the luma block and $R+1^{th}$ to $N^{th}$ transform coefficients of the chroma Cb block may be scanned. In the case that a non-zero transform coefficient is included in the scanned transform coefficients, the NSST index may be derived as 0. In the case that a non-zero transform coefficient is not included in the scanned transform coefficients, the bitstream may include a syntax element for the NSST index, and a value of the NSST index may be derived by parsing the syntax element for the NSST index received through a bitstream.

As another example, the NSST index may be used for inverse transform for transform coefficients of a luma block of the target block and transform coefficients of a chroma Cr block of the target block. In this case, $R+1^{th}$ to $N^{th}$ transform coefficients of the luma block and $R+1^{th}$ to $N^{th}$ transform coefficients of the chroma Cr block may be scanned. In the case that a non-zero transform coefficient is included in the scanned transform coefficients, the NSST index may be derived as 0. In the case that a non-zero transform coefficient is not included in the scanned transform coefficients, the bitstream may include a syntax element for the NSST index, and a value of the NSST index may be derived by parsing the syntax element for the NSST index received through a bitstream.

Meanwhile, based on a specific condition, a range of the NSST index may be derived. For example, based on the specific condition, a maximum value of the NS ST index may be derived, and the range may be derived from 0 to the derived maximum value. The value of the derived NS ST index may be included in the range.

For example, based on a size of the target block, a range of the NS ST index may be derived. Particularly, a minimum width and a minimum height may be preconfigured. Based on the minimum width and a width of the target block, the minimum height and a height of the target block, a range of the NSST index may be derived. In addition, based on a specific value or a sample number of the target block, a range of the NSST index may be derived. The sample number may be a value of multiplying a width and a height of the target block, and the specific value may be preconfigured.

In addition, as another example, based on a type of the target block, a range of the NSST index may be derived. Particularly, a range of the NS ST index may be derived based on whether the target block is a non-square block. In addition, a range of the NSST index may be derived based on a ratio between a width and a height of the target block and a specific value. The ratio between a width and a height of the target block may be a value of a long side between the width and the height of the target block divided by a short side, and the specific value may be preconfigured.

In addition, as another example, based on an intra prediction mode of the target block, a range of the NSST index may be derived. Particularly, a range of the NSST index may be derived based on whether the intra prediction mode of the target block is a non-directional intra prediction mode or a directional intra prediction mode. In addition, based on whether an intra prediction mode of the target block is an intra prediction mode included in category A or category B, a range of a value of the NSST index may be determined. Here, the intra prediction mode included in category A and the intra prediction mode included in category B may be preconfigured. As an example, the category A may include No. 2 intra prediction mode, No. 10 intra prediction mode, No. 18 intra prediction mode, No. 26 intra prediction mode, No. 34 intra prediction mode, No. 42 intra prediction mode, No. 50 intra prediction mode, No. 58 intra prediction mode and No. 66 intra prediction mode, and the category B may include intra prediction modes except the intra prediction modes included in the category A.

In addition, as another example, based on information for a core transform of the target block, a range of the NS ST index may be derived. For example, a range of the NS ST index may be derived based on an AMT flag that represents whether Adaptive Multiple core Transform (AMT) is applied. In addition, a range of the NSST index may be derived based on an AMT horizontal flag indicating a horizontal transform kernel and an AMT vertical flag indicating a vertical transform kernel.

Meanwhile, in the case that a value of the NS ST index is 0, the NS ST index may indicate that NSST is not applied to the target block.

The decoding apparatus performs inverse transform for the transform coefficients of the target block based on the NS ST index and derive residual samples of the target block (step S1520).

For example, in the case that a value of the NSST index is 0, the decoding apparatus may perform core transform for the transform coefficients of the target block and derive the residual samples.

Particularly, the decoding apparatus may obtain an AMT flag that represents whether Adaptive Multiple core Transform (AMT) is applied from a bitstream.

In the case that a value of the AMT flag is 0, the decoding apparatus may derive DCT type 2 as a transform kernel for the target block and derive the residual samples by performing inverse transform for the transform coefficients based on DCT type 2.

In the case that a value of the AMT flag is 1, the decoding apparatus may configure a transform subset for a horizontal transform kernel and a transform subset for a vertical transform kernel, derive a horizontal transform kernel and a vertical transform kernel based on the transform index information obtained from the bitstream and the transform subsets, and derive the residual samples by performing inverse transform for the transform coefficients based on the horizontal transform kernel and the vertical transform kernel. Here, the transform subset for the horizontal transform kernel and the transform subset for the vertical transform kernel may include DCT type 2, DCT type 7, DCT type 8 and/or DCT type 1 as a candidate. In addition, transform index information may be generated, and the transform index information may include an AMT horizontal flag indicating the horizontal transform kernel and an AMT vertical flag indicating the vertical transform kernel. Meanwhile, the transform kernel may be called a transform type or a transform core.

In the case that a value of the NSST index is not 0, the decoding apparatus may derive a modified transform coefficients by performing NSST for the transform coefficients located in a top-left target area of the target block based on a reduced transform matrix indicated by the NSST index and derive the residual samples by performing core transform for the target block including the modified transform coefficients. A size of the reduced transform matrix may be R×N. The N may be a sample number of the top-left target area, and the R may be a reduced coefficient. The R may be smaller than the N.

The core transform for the target block may be performed as below. The decoding apparatus may obtain an AMT flag that represents whether Adaptive Multiple core Transform (AMT) is applied from a bitstream. In the case that a value of the AMT flag is 0, the decoding apparatus may derive DCT type 2 as a transform kernel for the target block and derive the residual samples by performing inverse transform for the transform coefficients based on DCT type 2.

In the case that a value of the AMT flag is 1, the decoding apparatus may configure a transform subset for a horizontal transform kernel and a transform subset for a vertical transform kernel, derive a horizontal transform kernel and a vertical transform kernel based on the transform index information obtained from the bitstream and the transform subsets, and derive the residual samples by performing inverse transform for the target block including the modified transform coefficients based on the horizontal transform kernel and the vertical transform kernel. Here, the transform subset for the horizontal transform kernel and the transform subset for the vertical transform kernel may include DCT type 2, DCT type 7, DCT type 8 and/or DCT type 1 as a candidate. In addition, transform index information may be generated, and the transform index information may include an AMT horizontal flag indicating the horizontal transform kernel and an AMT vertical flag indicating the vertical transform kernel. Meanwhile, the transform kernel may be called a transform type or a transform core.

The decoding apparatus generates a reconstructed picture based on the residual samples (step, S1530). The decoding apparatus may generate a reconstructed picture based on the residual samples. For example, the decoding apparatus may perform an inter prediction and an intra prediction for the target block based on the prediction information received through a bitstream and derive prediction samples and generate the reconstructed picture through a summation of the prediction samples and the residual samples. Later, as occasion demands, in order to improve subjective/objective image quality, the decoding apparatus may apply the in-loop filtering process such as deblocking filtering and/or SAO process to the reconstructed picture as described above.

Figure 16:
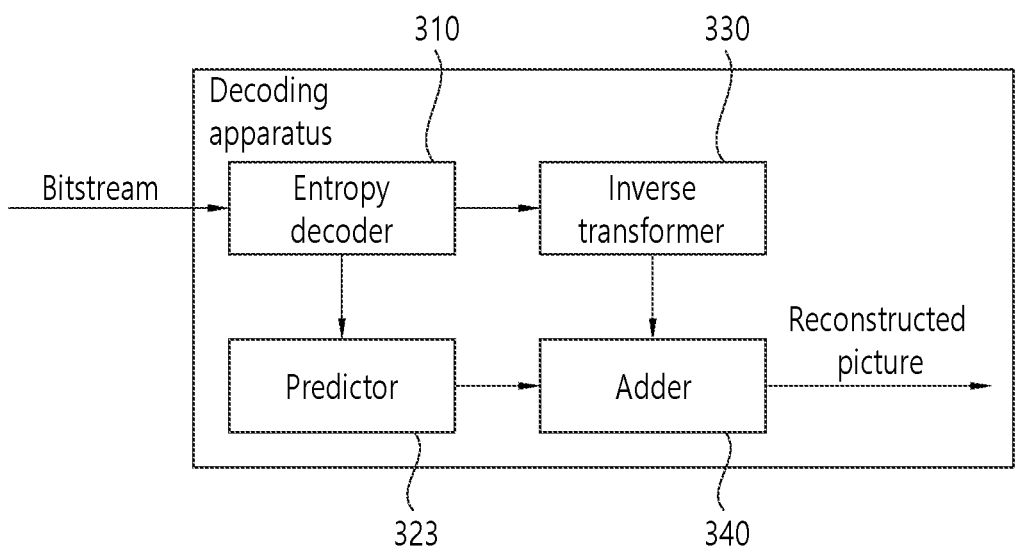
FIG. 16 schematically illustrates the decoding apparatus performing the video decoding method according to the present disclosure.

FIG. 16 schematically illustrates the decoding apparatus performing the video decoding method according to the present disclosure. The method shown in FIG. 15 may be performed by the decoding apparatus shown in FIG. 16. Particularly, for example, the entropy decoder of the decoding apparatus shown in FIG. 16 may perform steps S1500 to S1510 of FIG. 15, the inverse transformer of the decoding apparatus shown in FIG. 16 may performs step S1520 of FIG. 15, and the adder of the decoding apparatus of FIG. 16 may perform step S1530 of FIG. 15. In addition, although it is not shown, the process of obtaining the prediction sample may be performed by the predictor of the decoding apparatus.

According to the present disclosure described above, a range of NSST index may be derived based on a specific condition of a target block, and through this, bit amount for the NS ST index may be reduced, and accordingly, overall coding rate may be improved.

In addition, according to the present disclosure, a transmission of syntax element for NS ST index may be determined based on transform coefficients for a target block, and through this, bit amount for the NS ST index may be reduced, and accordingly, overall coding rate may be improved.

In the above-described embodiment, the methods are described based on the flowchart having a series of steps or blocks, but the present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software form, and the encoding apparatus and/or the decoding apparatus according to the present disclosure may be included in an apparatus that performs image processing such as a TV, a computer, a smartphone, a set-top box, a display device, and the like.

When the embodiments of the present disclosure is implemented with software, the method described above may be implemented with a module (process, function, etc.) that performs the function described above. The module may be stored in a memory and executed by a processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. That is, the embodiments described in the present disclosure may be performed by being implemented on a processor, a micro-processor, a controller or a chip. For example, the functional units shown in each drawing may be implemented and performed on a computer, a processor, a micro-processor, a controller or a chip.

In addition, the decoding apparatus and the encoding apparatus to which the embodiments of the present disclosure are applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus and a medical video apparatus and may be used to process video signals and data signals. For example, the OTT video apparatus may include a game console, a blue-ray player, an internet access TV, a home theater system, a smartphone, a tablet PC, a Digital Video Recorder (DVR), and the like.

Further, the processing method to which the present disclosure is applied may be produced in the form of a computer-executed program and may be stored in a computer-readable recording medium. The multimedia data having the data structure according to the present disclosure can also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-Data storage devices. In addition, the computer-readable recording medium includes media implemented in the form of a carrier wave (for example, transmission over the Internet). In addition, the bit stream generated by the encoding method can be stored in a computer-readable recording medium or transmitted over a wired or wireless communication network. In addition, the embodiment of the present disclosure may be a computer program product by program codes, and the program codes may be performed by a computer by the embodiment of the present disclosure. The program codes may be stored on a carrier which is readable by a computer.

Further, a content streaming system to which the present disclosure is applied may include an encoding server, a streaming server, a web server, a media storage, a user device, and a multimedia input device.

The encoding server compresses content input from multimedia input devices such as smartphones, cameras, camcorders, etc. Into digital data to generate a bitstream and transmit the bitstream to the streaming server. As another example, when multimedia input devices such as smartphones, cameras, camcorders, etc. directly generate a bitstream, the encoding server may be omitted. The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. A video decoding method performed by a decoding apparatus, comprising:
    obtaining prediction mode information and residual information from a bitstream;
    deriving prediction samples for a target block based on the prediction mode information;
    deriving transform coefficients of the target block based on the residual information;
    determining whether a non-zero transform coefficient exists in (R+1)th to Nth transform coefficients among the transform coefficients of the target block;
    deriving a non-separable transform index for the target block based on the determination of whether the non-zero transform coefficient exists in the (R+1)th to Nth transform coefficients;
    deriving residual samples of the target block by performing an inverse transform based on the transform coefficients of the target block, wherein the inverse transform is based on the non-separable transform index; and
    generating a reconstructed picture based on the prediction samples and the residual samples,
    wherein based on a case that the non-zero transform coefficient exists is included in the (R+1)th to Nth transform coefficients, a value of the non-separable transform index is derived as 0,
    wherein based on a case of the value of the non-separable transform index not being equal to 0, the inverse transform based on a non-separable transform is performed on input coefficients of the inverse transform based on a transform matrix related to the non-separable transform index, and wherein the R is a number of the input coefficients of the inverse transform, and the N is a number of the transform coefficients in the target block.

2. A video encoding method performed by an encoding apparatus, comprising:

deriving a prediction mode of a target block;

deriving prediction samples for the target block based on the prediction mode;

generating prediction mode information based on the prediction mode;

deriving residual samples of the target block based on the prediction samples;

deriving transform coefficients for the target block by performing a transform based on the residual samples;

determining whether a non-zero transform coefficient exists in (R+1)th to Nth transform coefficients among the transform coefficients of the target block;

determining whether to encode a non-separable transform index for the target block based on the determination of whether the non-zero transform coefficient exists in the (R+1)th to Nth transform coefficients; and encoding the prediction mode information and residual information including information related to the transform coefficients, wherein based on a case that the transform based on a non-separable transform is performed on the transform coefficients based on a transform matrix related to the non-separable transform index, the non-zero transform coefficient does not exist in the (R+1)th to Nth transform coefficients, wherein based on a case that the non-zero transform coefficient exists in the (R+1)th to Nth transform coefficients, the non-separable transform index is determined not to encode, and wherein the R is a number of output coefficients of the transform, and the N is a number of the transform coefficients in the target block.

3. A computer-readable storage medium storing a bitstream generated by steps of:

deriving a prediction mode of a target block;

deriving prediction samples for the target block based on the prediction mode;

generating prediction mode information based on the prediction mode;

deriving residual samples of the target block based on the prediction samples;

deriving transform coefficients for the target block by performing a transform based on the residual samples;

determining whether a non-zero transform coefficient exists in (R+1)th to Nth transform coefficients among the transform coefficients of the target block;

determining whether to encode a non-separable transform index for the target block based on the determination of whether the non-zero transform coefficient exists in the (R+1)th to Nth transform coefficients; and encoding the prediction mode information and residual information including information related to the transform coefficients, wherein based on a case that the transform based on a non-separable transform is performed on the transform coefficients based on a transform matrix related to the non-separable transform index, the non-zero transform coefficient does not exist in the (R+1)th to Nth transform coefficients, wherein based on a case that the non-zero transform coefficient exists in the (R+1)th to Nth transform coefficients, the non-separable transform index is determined not to encode, and wherein the R is a number of output coefficients of the transform, and the N is a number of the transform coefficients in the target block.

4. A transmission method of data for a video, the method comprising:

obtaining a bitstream for the video, wherein the bitstream is generated based on deriving a prediction mode of a target block, deriving prediction samples for the target block based on the prediction mode, generating prediction mode information based on the prediction mode, deriving residual samples of the target block based on the prediction samples, deriving transform coefficients for the target block by performing a transform based on the residual samples, determining whether a non-zero transform coefficient exists in (R+1)th to Nth transform coefficients among the transform coefficients of the target block, determining whether to encode a non-separable transform index for the target block based on the determination of whether the non-zero transform coefficient exists in the (R+1)th to Nth transform coefficients, and encoding the prediction mode information and residual information including information related to the transform coefficients; and transmitting the data comprising the bitstream, wherein based on a case that the transform based on a non-separable transform is performed on the transform coefficients based on a transform matrix related to the non-separable transform index, the non-zero transform coefficient do not exist in the (R+1)th to Nth transform coefficients, wherein based on a case that the non-zero transform coefficient exists in the (R+1)th to Nth transform coefficients, the non-separable transform index is determined not to encode, and wherein the R is a number of output coefficients of the transform, and the N is a number of the transform coefficients in the target block.

\* \* \* \* \*